(12) United States Patent
Vardanyan et al.

(10) Patent No.: US 11,023,390 B1
(45) Date of Patent: Jun. 1, 2021

(54) RESIZING CIRCUITRY

(71) Applicant: Arm Limited, Cambridge (GB)

(72) Inventors: Eduard Vardanyan, Sheffield (GB); Sean James Salisbury, Appley Bridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/831,975

(22) Filed: Mar. 27, 2020

(51) Int. Cl.
*G06F 13/14* (2006.01)

(52) U.S. Cl.
CPC ...... *G06F 13/14* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 5,155,741 A * | 10/1992 | Waters | ............... | H04B 1/707 375/142 |
| 5,281,967 A * | 1/1994 | Jung | ............... | H03M 7/3086 341/51 |
| 5,414,796 A * | 5/1995 | Jacobs | ............... | H04L 1/0057 704/221 |
| 2002/0033900 A1* | 3/2002 | Honma | ............... | H04N 9/64 348/581 |
| 2010/0110222 A1* | 5/2010 | Smith | ............... | H04N 1/32603 348/222.1 |

* cited by examiner

*Primary Examiner* — Michael Sun
(74) *Attorney, Agent, or Firm* — Nixon & Vanderhye P.C.

(57) ABSTRACT

Resizing circuitry comprises at least one buffer having buffer entries each corresponding to one of at least two shift registers, each shift register comprising storage circuits connected in a ring to transfer a token bit between storage circuits. Selection circuitry controls, based on the shift registers, writing of data sections of input data units having a first number of data sections to the buffer(s), to form output data units having a second number of data sections. For a given buffer entry corresponding to a given shift register, depending on whether the token bit is stored in a first or second subset of storage circuits, the selection circuitry controls writing of a selected data section of a received input data unit to the given buffer entry or prevents overwriting of the given buffer entry. At least two of the shift registers have different relative arrangements of the first and second subsets of storage circuits.

19 Claims, 16 Drawing Sheets

Data in double buffer at start of cycle

| Cycles | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 8 | | | B4 | B4 | B4 | D4 | D4 | F4 | H4 | H4 | H4 | J4 | J4 | |
| 7 | | | B3 | B3 | D3 | D3 | D3 | F3 | H3 | H3 | J3 | J3 | J3 | |
| 6 | | | B2 | B2 | D2 | D2 | D2 | F2 | H2 | H2 | J2 | J2 | J2 | |
| 5 | | | B1 | B1 | D1 | D1 | F1 | F1 | H1 | H1 | J1 | J1 | L1 | |
| 4 | | | A4 | A4 | C4 | E4 | E4 | E4 | G4 | G4 | I4 | K4 | K4 | |
| 3 | | A3 | A3 | A3 | C3 | E3 | E3 | G3 | G3 | G3 | I3 | K3 | K3 | |
| 2 | | A2 | A2 | A2 | C2 | E2 | E2 | G2 | G2 | G2 | I2 | K2 | K2 | |
| 1 | | A1 | A1 | C1 | C1 | E1 | E1 | G1 | G1 | I1 | I1 | K1 | K1 | |

Output stream output in cycle

| Cycles | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | | | A4 | B4 | C4 | D4 | E4 | F4 | G4 | H4 | I4 | J4 | K4 | |
| | | | A3 | B3 | C3 | D3 | E3 | F3 | G3 | H3 | I3 | J3 | K3 | |
| | | | A2 | B2 | C2 | D2 | E2 | F2 | G2 | H2 | I2 | J2 | K2 | |
| | | | A1 | B1 | C1 | D1 | E1 | F1 | G1 | H1 | I1 | J1 | K1 | L1 |

Mux select table

| | Cycles | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Mux 8 | 2 | 4 | M | - | 0 | M | 2 | 4 | M | - | 0 | M |
| Mux 7 | 1 | 3 | M | 5 | - | M | 1 | 3 | M | 5 | - | M |
| Mux 6 | 0 | 2 | M | 4 | - | M | 0 | 2 | M | 4 | - | M |
| Mux 5 | - | 1 | M | 3 | C | 5 | - | 1 | M | 3 | C | 5 |
| Mux 4 | - | 0 | M | 2 | 4 | M | - | 0 | M | 2 | 4 | M |
| Mux 3 | 5 | - | M | 1 | 3 | M | 5 | - | M | 1 | 3 | M |
| Mux 2 | 4 | - | M | 0 | 2 | M | 4 | - | M | 0 | 2 | M |
| Mux 1 | 3 | C | 5 | - | 1 | M | 3 | C | 5 | - | 1 | M |

FIG. 12

RESIZING CIRCUITRY

BACKGROUND

Technical Field

The present technique relates to the field of integrated circuits. More particularly, it relates to resizing circuitry for resizing data units.

Technical Background

An integrated circuit may have a number of nodes which communicate with each other by sending data units from one node to another. For example, an interconnect may be provided to connect different nodes of an integrated circuit. Data units may pass over the interconnect. Sometimes, it may be needed to resize a data unit being passed from one node to another, for example because the data unit is to be transferred on a downstream transmission channel of a different size to a transmission channel used upstream. Hence, the integrated circuit may have resizing circuitry for resizing data units.

SUMMARY

At least some examples provide resizing circuitry for resizing data units transferred between nodes of an integrated circuit; the resizing circuitry comprising: at least one buffer comprising a plurality of buffer entries; a plurality of circular shift registers, each of the plurality of buffer entries corresponding to one of the plurality of circular shift registers, each circular shift register comprising a plurality of storage circuits connected in a ring to transfer a token bit from storage circuit to storage circuit; and selection circuitry to control, based on the plurality of circular shift registers, writing of data sections of input data units having a first number of data sections to the at least one buffer, to form output data units having a second number of data sections; in which: for a given buffer entry corresponding to a given circular shift register: in a cycle when the token bit is stored in one of a first subset of storage circuits of the given circular shift register, the selection circuitry is configured to control writing of a selected data section of a received input data unit to the given buffer entry, the selected data section selected depending on which of the first subset of storage circuits stores the token bit; and in a cycle when the token bit is stored in one of a second subset of storage circuits of the given circular shift register, the selection circuitry is configured to prevent the given buffer entry being overwritten; and the plurality of circular shift registers include at least two circular shift registers with different arrangements of the second subset of storage circuits relative to the first subset of storage circuits.

At least some examples provide an on-chip interconnect to transfer data between nodes of an integrated circuit, the on-chip interconnect comprising the resizing circuitry.

At least some examples provide an integrated circuit comprising the on-chip interconnect described above.

At least some examples provide a method for resizing data units transferred between nodes of an integrated circuit; the method comprising: controlling writing of data sections of input data units having a first number of data sections to at least one buffer comprising a plurality of buffer entries, to form output data units having a second number of data sections, where the writing is controlled based on a plurality of circular shift registers, each of the plurality of buffer entries corresponding to one of the plurality of circular shift registers, each circular shift register comprising a plurality of storage circuits connected in a ring to transfer a token bit from storage circuit to storage circuit; and for a given buffer entry corresponding to a given circular shift register: in a cycle when the token bit is stored in one of a first subset of storage circuits of the given circular shift register, controlling writing of a selected data section of a received input data unit to the given buffer entry, the selected data section selected depending on which of the first subset of storage circuits stores the token bit; and in a cycle when the token bit is stored in one of a second subset of storage circuits of the given circular shift register, preventing the given buffer entry being overwritten; wherein the plurality of circular shift registers include at least two circular shift registers with different arrangements of the second subset of storage circuits relative to the first subset of storage circuits.

At least some examples provide a computer-implemented method of generating an electronic design file representing a design of an on-chip interconnect for providing data transfer between devices of an integrated circuit; the method comprising: in response to design specification data identifying properties of the devices to be connected by the on-chip interconnect, generating the electronic design file specifying that the on-chip interconnect comprises resizing circuitry for resizing data units transferred by the on-chip interconnect; the resizing circuitry comprising: at least one buffer comprising a plurality of buffer entries; a plurality of circular shift registers, each of the plurality of buffer entries corresponding to one of the plurality of circular shift registers, each circular shift register comprising a plurality of storage circuits connected in a ring to transfer a token bit from storage circuit to storage circuit; and selection circuitry to control, based on the plurality of circular shift registers, writing of data sections of input data units having a first number of data sections to the at least one buffer, to form output data units having a second number of data sections; in which: for a given buffer entry corresponding to a given circular shift register: in a cycle when the token bit is stored in one of a first subset of storage circuits of the given circular shift register, the selection circuitry is configured to control writing of a selected data section of a received input data unit to the given buffer entry, the selected data section selected depending on which of the first subset of storage circuits stores the token bit; and in a cycle when the token bit is stored in one of a second subset of storage circuits of the given circular shift register, the selection circuitry is configured to prevent the given buffer entry being overwritten; and the plurality of circular shift registers include at least two circular shift registers with different arrangements of the second subset of storage circuits relative to the first subset of storage circuits.

At least some examples provide a non-transitory storage medium storing a computer program to control a data processing apparatus to perform the method of generating the electronic design file described above.

Further aspects, features and advantages of the present technique will be apparent from the following description of examples, which is to be read in conjunction with the accompanying drawings.

BRIEF DESCRIPTION OF THE DRAWINGS

FIGS. 8-12 illustrate a worked example using the shift register layout shown in FIG. 7;

DESCRIPTION OF EXAMPLES

Figure 1:
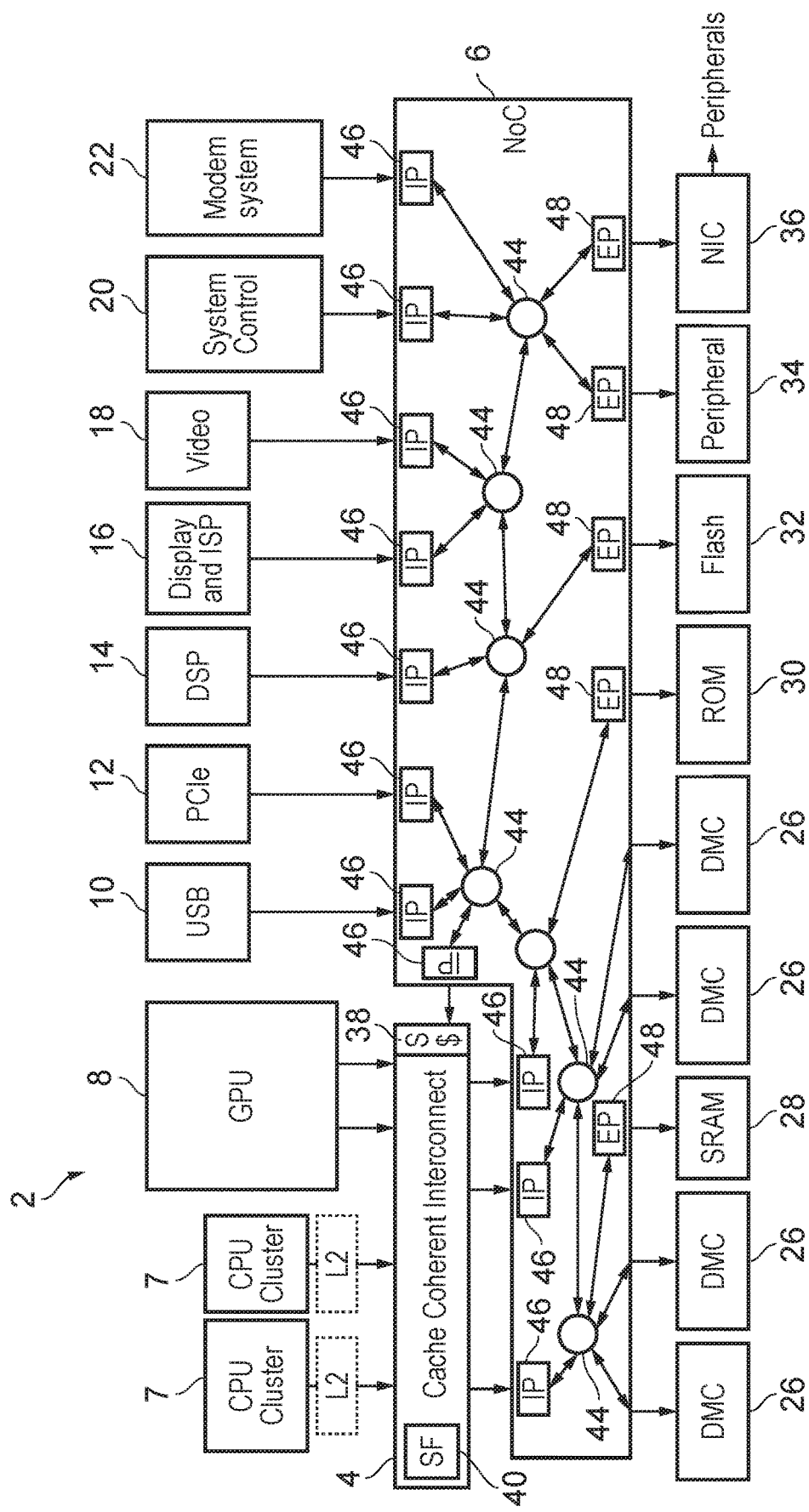
FIG. 1 schematically illustrates an example of an integrated circuit comprising an on-chip interconnect.

Resizing circuitry may be provided for resizing data units transferred between nodes of an integrated circuit. The resizing circuitry may receive input data units which have a first number of data sections and resize them to form output data units which have a second number of data sections, where the first number and the second number are different. To perform the resizing, the resizing circuitry may have at least one buffer having a number of buffer entries, and selection circuitry which may control writing of data sections of input data units to the at least one buffer to form the output data units. The writing of the data sections to the at least one buffer may be controlled based on a number of circular shift registers, where each circular shift register includes a certain number of storage circuits connected in a ring to transfer a token bit from storage circuit to storage circuit. Each buffer entry corresponds to one of the circular shift registers. For a given buffer entry corresponding to a given circular shift register: in a cycle when the token bit is stored in one of a first subset of storage circuits of the given circular shift register, the selection circuitry controls writing of a selected data section of a received input data unit to the given buffer entry (with the selected data section selected depending on which of the first subset of storage circuits stores the token bit). In a cycle when the token bit is stored in one of a second subset of storage circuits of the given circular shift register, the selection circuitry prevents the given buffer entry being overwritten. This technique of using the position of the token bit within the circular shift registers to control which data section (if any) is written to a given buffer entry in a given cycle can be useful to deal with cases where the ratio between the first number of data sections and the second number of data sections is not a power of 2, so that more arbitrary resizing of data units is possible.

Hence, each circular shift register includes a first subset of storage circuits, which are at positions in the ring corresponding to cycles when an input data section is to be written to the corresponding buffer entry, and a second subset of storage circuits, which are at positions in the ring corresponding to cycles when no input data section is to be written to the corresponding buffer entry. One might think that, as it is possible for the output data units to be populated with data sections from the received input data units in a sequential order, so that each successive data section in the input data unit is allocated to the next available buffer entry in turn, then the circular shift registers for the respective buffer entries should have a symmetric arrangement of storage circuits where the relative arrangement of the positions of the first and second subsets of storage circuits should be the same for each circular shift register (but with the circular shift registers being initialised to start the token bit at different positions around the ring in the first cycle when data sections are to be written to the buffer entries).

However, counter-intuitively, the inventor recognised that, while such a symmetric arrangement of circular shift registers can work in some cases, for some combinations of the first number of data sections, the second number of data sections and number of offset positions by which the first data section to be written to the output buffer is offset from the start of a received input data section, it can be useful for the respective circular shift registers to include at least two circular shift registers with different arrangements of the second subset of storage circuits relative to the first subset of storage circuits. This can help to deal with a "convolution" problem where in some scenarios a given buffer entry could be overwritten too early, before a previous data section written to that buffer entry has been read out as part of an output data unit. While one solution to this problem could be to provide extra buffers so that there is more buffer space available for buffering a larger number of output units, this may incur extra circuit area and power consumption and so a more efficient technique can be to use different arrangements of the first/second subsets of storage circuits within the circular shift registers to deal with this problem.

In one example, for the at least two circular shift registers having the different arrangements of the first/second subsets of storage circuits, the selection circuitry may select, as the selected data section to be written to the corresponding buffer entry, a first data section of the received input data unit when the token bit is stored in a first storage circuit of the first subset, and a second data section of the received input data unit when the token bit is stored in a second storage circuit of the first subset. The at least two shift registers may have different numbers of storage circuits of the second subset connected in the ring between the first storage circuit and the second storage circuit. For example, compared to another of the at least two circular shift registers, one of the at least two shift registers may have at least one additional storage circuit of the second subset between the first/second storage circuits of the first subset which correspond to the particular first/second data sections at particular data sections positions within the input data unit. This additional storage circuit can provide an extra cycle where no overwriting of the corresponding buffer entry occurs which can help to address the convolution overwriting problem described above. Different circular shift registers could have the additional registers inserted at different positions. Hence, by varying the positions at which extra storage circuits of the second subset are disposed within the ring for respective shift registers, this can help avoid data sections of the input data unit being prematurely overwritten in the buffer and hence avoid the need for incurring the area/power cost of providing additional buffer space to deal with the overwriting problem.

In one example the circular shift registers may include a convolution-avoiding circular shift register. The convolution-avoiding circular shift register may include a convolution avoidance storage circuit which is one of the second subset of storage circuits, so that when the token bit is stored in the convolution avoidance storage circuit then no overwrite is performed on the buffer entry corresponding to the convolution-avoiding circular shift register. The position of the convolution avoidance storage circuit within the ring of the convolution-avoiding circular shift register may be chosen so that it prevents a previously written data section in the buffer entry corresponding to the convolution-avoiding circular shift register being overwritten with one data section of the received input data unit in a cycle when another buffer entry (corresponding to a different circular shift register) is to be written with another data section of the received input data unit, where the previously written data section and the other data section both are to form part of the same output data unit.

This recognises that for some combinations of input and output number of data sections, if a set of circular shift registers with a symmetric arrangement of storage circuits was used it is possible that early overwriting of a buffer entry may occur in the following circumstance. After a certain processing cycle a given output data unit may not yet have been fully populated with input data sections from a received input data unit. In the following cycle, if all the data sections from the next input data unit are written to the buffers according to the symmetric cyclic sequence, then as well as filling the last remaining data sections of that previously partially filled output data unit, the writing of data sections into the buffer may wrap around to the start of that same output data unit and start to overwrite previously written data sections, which have not yet been transferred to the downstream node from the buffer because the output data unit was not completely full at the end of the previous cycle. This problem is addressed by providing a convolution-avoiding circular shift register which includes an additional convolution avoidance storage circuit at a certain position of the ring which ensures that the token bit will be stored in the convolution avoidance storage circuit in the cycle when the currently partially buffered output data unit is being filled with the other data section in the other buffer entry, so that the previously written data section in the one buffer entry corresponding to the convolution-avoiding circular shift register is not overwritten.

The convolution avoidance storage circuit effectively masks the overwrite which would normally have occurred in that cycle for the buffer entry corresponding to the convolution-avoiding circular shift register. This masking is achieved by adding an additional storage circuit within the ring of the convolution-avoiding circular shift register, rather than introducing separate masking circuit logic which combines the output of one of the storage circuits in the ring with a masking signal, using an AND gate or other Boolean circuit logic disposed outside of the ring. By avoiding the need for the outputs of storage circuits within the ring of the circular shift register to be qualified by masking logic, this can reduce the logic depth for determining which data section of the received input data unit should be written to a given buffer entry and hence improves performance and reduces the amount of circuitry required.

Within the convolution-avoiding circular shift register, after the convolution-avoidance storage circuit, the following storage circuit (to which the token bit would be transferred in the cycle after the token bit is stored by the convolution-avoidance storage circuit) may be one of the first subset of storage circuits which, when the token bit is in that following storage circuit, controls the selection circuitry to select, as the selected data section to be written to the buffer entry corresponding to the convolution-avoiding circular shift register, the one data section of the received input data unit which would otherwise have been overwritten in the previous cycle if the convolution avoidance storage circuit had not been provided. Hence, the convolution avoidance storage circuit is an additional storage circuit at a position within the ring of the circular shift register which precedes the storage circuit at the particular position which would encounter the convolution overwriting problem.

As mentioned above, the convolution-avoiding circular shift register includes the convolution avoidance storage circuit to ensure that a previously written data section in the corresponding buffer entry is not overwritten in a cycle when another buffer entry is to be written with another data section of the received input data unit. The circular shift register corresponding to that other buffer entry may comprise a masking storage circuit of the second subset, where the masking storage circuit is positioned in the ring to prevent the other buffer entry being overwritten in the cycle following the cycle in which the other buffer entry is written with the other data section of the received data unit. This masking storage circuit effectively equalises the number of storage circuits in the circular shift registers so that each of the circular shift registers can follow a cyclic pattern of cycles with the same repetition length. The masking storage circuit can be positioned following the storage circuit which would store the token bit in that other circular shift register in the same cycle in which the token bit of the convolution-avoiding circular shift register is stored in the convolution avoidance storage circuit.

The above example describes a single convolution-avoiding circular shift register. However, in some cases two or more of the circular shift registers may be convolution-avoiding circular shift registers. In this case, the position of the convolution avoidance storage circuit may differ in the respective convolution-avoiding circular shift registers. Likewise, where there are two or more other circular shift registers which have masking storage circuits as discussed above, these may be at different relative positions in the ring.

Also, in some cases, depending on the number of data sections in the input and output data units, a convolution-avoiding circular shift register could have more than one convolution avoidance storage circuit included, each convolution avoidance storage circuit arranged as discussed above but at a different position within the ring, and in a corresponding way the other circular shift registers corresponding to other buffer entries could have more than one masking storage circuit.

Based on the different arrangements of the second subset of storage circuits relative to the first subset of storage circuits in the circular shift registers (e.g. due to the differing positions of convolution avoidance storage circuits and masking storage circuits as discussed above) the selection circuitry may control writing to the at least one buffer in a pair of successive cycles such that: in a first cycle of the pair of successive cycles, a first subset of the plurality of buffer entries is overwritten with one or more data sections of the received input data unit, and a second subset of the plurality of buffer entries is prevented from being overwritten; and in a second cycle of the pair of successive cycles, the first subset of the plurality of buffer entries is prevented from being overwritten, and the second subset of the plurality of buffer entries is overwritten with one or more remaining data sections of the received input data unit other than the one or more data sections written in the first cycle. Hence, with this approach there may be a pair of cycles where there is no overlap between the buffer entries overwritten in the first cycle and the buffer entries overwritten in the second cycle, with different subsets of buffer entries overwritten in the respective cycles and the buffer entries overwritten in one of these cycles not being overwritten in the other. While one might think that spreading the writing of the input data sections from a given received input data unit to the buffer across two separate cycles may be less efficient and cause an extra cycle's delay, in practice this is useful to deal with the convolution overwriting problem discussed above.

The techniques discussed above can be particularly useful where the first number of data sections is greater than the second number of data sections, as in this case then the input data units may include data sections which need to be split across multiple output data units and it is in this scenario where the convolution overwriting problem may arise.

The resizing circuitry may have N buffers where N is greater than or equal to 2. Each buffer may comprise M buffer entries, where M is equal to the second number of data sections within one output data unit. Hence, although the output data units are to be output each comprising M data sections, buffer capacity is provided to store N*M data sections so that while one buffer is being read out to provide an output data unit to be transferred downstream, the selection circuitry may be controlling overwriting of another buffer based on data sections read from received input data units. By providing at least two buffers this can provide better performance as it allows at least some parallelisation of reads/writes to the buffers. With two or more buffers, while there may occasionally be a cycle where the writing to the buffers has to wait because there are no available buffers where the output data has not yet been read out, this may be less frequent than if only one buffer is provided. It will be appreciated that the N buffers could be provided as N physically separate storage units, or could refer to N different sub-portions of a single storage unit.

It can be particularly useful to apply the techniques discussed above in cases where the first number of data sections is greater than ((N−1)*M)+1 and less than N*M. When this condition is satisfied, this means that an input data unit has enough data sections that, if the first data section in the input data unit is allocated to a buffer entry which is not the very first buffer entry of a given buffer, then that input data unit may spread across N+1 different output data units, and so if there are only N buffers then this means that in the cycle where one or more final data sections are being allocated into a given buffer, then if all the data sections of the received input data unit are written to the buffers in the same cycle then this would also overwrite at least one of the previously written data units of that first buffer, leading to loss of data if the overwriting problem is not addressed. Hence, for cases where the first number of data sections is between ((N−1)*M)+1 and N*M it can be particularly useful to use the differing arrangements of circular shift registers, for example by including convolution avoidance storage elements and masking storage elements, as discussed above.

Whether or not any "convolution" overwriting occurs for a particular combination of values of L, M, N may also depend on a "header" size H indicating a number of offset positions by which the first data section to be written to the output buffer is offset from the start of a received input data section. This may reflect that in a certain network packet comprising a certain number of data units, the first data unit may include a header portion which provides control information which does not have to be mapped to an output data unit. This can mean that the first data section written to the output data unit is taken from a position in an input data unit which is not the first data section of the input data unit. Varying the header size for a given ratio between the first/second numbers of data sections L:M can change whether or not the convolution overwriting happens at all, and vary the cycles in which the convolution overwriting happens.

The techniques discussed above can be particularly useful for examples where the ratio between the first and second numbers of data sections is not an exact power of 2. When the ratio between the numbers of data sections in the input and output data units is not a power of two then this may mean that a given buffer entry is not always written with a data section from the same position within the input data unit, so that it is useful to use the circular shift registers to track which data section should be written to that buffer entry, and so this may lead to the problem of convolution overwriting as discussed above which can be addressed using the techniques described above.

Output circuitry may output an output data unit formed in a given buffer for transfer to a downstream node of the integrated circuit, once that output data unit is ready. One approach to handling outputting of output data units could be to allow gaps to be formed within the output data unit, so that it is not necessary to fully populate an output data unit with data sections. However, while this may be simpler to control in the cases of resizing involving irregular non-power-of-2 ratios of numbers of input/output data sections, these empty data sections in output data units would cause less efficient utilisation of bandwidth, which can harm performance. Therefore, it may be preferred that output data units are filled to the greatest extent possible so that, unless the number of remaining data sections of input data units awaiting to be transferred is insufficient to populate a full output data unit, the output circuitry may defer outputting the output data unit until the output data unit is fully populated with the second number of data sections obtained from one or more received input data units. This approach can improve network quality of service by using available bandwidth within the transmission channel to the greatest extent possible, but it makes it more complex to control the resizing and leads to the overwriting problem discussed above. Hence, the techniques discussed above can be particularly useful in enabling this full population of output data units to be feasible for non-power of two resizing ratios, which can be particularly useful on an integrated circuit for which the level of traffic on the transmission channel may be relatively high, for example because the data units are being used to control access to memory or peripheral devices on request from processing units.

The selection circuitry may control the writing of data sections to the at least one buffer so that a relative order of the data sections in the output data units corresponds to a relative order of the data sections in the input data units. By filling up the output data units in the same order as which the data sections appear in the input data units, this can make downstream processing of the data units simpler and means less control information identifying each data section may be needed as the ordering may be implicit rather than using explicit encoding of the ordering. The use of the circular shift registers helps to control this in-order population of the output data units even in cases where the resizing ration is not an exact power of two.

The selection circuitry may comprise a number of multiplexers, with each multiplexer corresponding to a respective one of the buffer entries and having a number of selection lines which control selection of the data sections at different input data section positions within the received input data unit. When the selection line corresponding to a particular input data section position is asserted, this may control the multiplexer to select the data section at that particular input data section position as the selected data section to be written to the corresponding buffer entry.

For a given multiplexer, each of the selection lines may be coupled to an output of a respective storage circuit of the first subset within the corresponding circular shift register for the buffer entry corresponding to that multiplexer. In contrast, the storage circuits of the second subset may not have selection lines coupled to their outputs. The token bit may have a value representing assertion of the multiplexer selection line—in many implementations this may be done by the token bit having a value of binary 1, although it would also be possible to build an implementation where the token bit has binary 0 and this is inverted to control the assertion of the multiplexer selection line. Hence, when the token bit is stored in one of the first subset of storage circuits for a given shift register, the corresponding multiplexer's selection line coupled to the output of that particular storage circuit is asserted and this controls the multiplexer to select the data section at a corresponding position in the input data unit for writing to the corresponding buffer entry for that given shift register. In a cycle when the token bit for a given shift register is in one of the second subset of storage circuits then none of the multiplexer selection lines will be asserted for the corresponding multiplexer and so this prevents the corresponding buffer entry being overwritten.

The resizing circuitry discussed above may be included within an on-chip interconnect for transferring data between nodes of an integrated circuit. The interconnect may itself be part of an integrated circuit which could for example be a system on chip for which the on-chip interconnect is used to route memory access requests between processing units and memory storage or other peripheral devices.

In some examples, it is possible for the design of the on-chip interconnect for such an integrated circuit to be designed electronically using a computer-implemented method which generates an electronic design file representing the design of the on-chip interconnect. The method may include receiving design specification data which identifies properties of the devices to be connected by the on-chip interconnect. For example these devices could include processing units such as a central processing unit (CPU) or graphics processing units (GPU), and memory devices such as memory controllers, on chip storage and peripheral controllers for controlling access to peripheral devices. The design specification data could for example specify the data sizes to be used by respective devices and information about the expected level of network traffic and then the computer implemented method may use that design specification data to select properties of the on-chip interconnect such as selecting which components to include within the interconnect and to select parameters for those components such as transmission channel widths, number of parallel transmission channels provided, etc. Hence, an electronic design file may be generated which specifies data characterising the design of the on-chip interconnect, which is generated in dependence on the design specification data. This electronic design file could represent the on-chip interconnect at different levels of generality. In some cases the design file may simply record some design parameters but need not provide a component-by-component representation of the on-chip interconnect. Alternatively the electronic design file may include a representation of each component to be included within the interconnect at a functional level, but need not specify the low-level transistor layout for the interconnect, which could be provided at a later stage of design. Alternatively the electronic design file may specify the design at a lower level such as specifying the individual transistor layouts or other aspects of the design for controlling integrated circuit manufacture.

Whatever the form of the electronic design file generated, the design file may include a specification that the on-chip interconnect comprises at least one instance of the resizing circuitry described above. This may be useful if the design specification data indicates that there will be devices which use different sized transmission channels, or if given different levels of bandwidth or quality of service needed for given devices, some internal network paths within the on-chip interconnect are to be wider than others. Hence, by including a representation of the resizing circuitry described above then this can enable more efficient resizing of data units within the on-chip interconnect when the integrated circuit is subsequently manufactured to the design represented by the electronic design file.

As part of the method of generating the design of the interconnect, the method may comprise selecting, based on the design specification data, the first number of data sections and the second number of data sections for the resizing circuitry. For example the first and second numbers of data sections may be selected based on information in the design specification data which indicates bandwidth or level of service requirements for devices to be connected, which can then be used to determine the size of various interconnect transmission paths and hence the number of data sections to transmit on those paths. At boundaries between paths using different numbers of data sections, resizing circuitry may be provided, and based on the selected first/second number of data sections for the input/output data units to be processed at the resizing circuitry, the method may select at least one parameter of the resizing circuitry, including at least a parameter which indicates information on the different arrangements of the storage circuits of the first subset and the second subset for at least two circular shift registers. For example, the at least one parameter could include an indication of the position at which a convolution avoidance storage circuit or masking storage circuit is to be included within the ring of a given circular shift register. This position can be calculated based on the first and second numbers of data sections as well as other information such as the total number of buffer entries to be included in the resizing circuitry and other information such as, for example, a header size used in a network packet according to a network protocol to be used by the on-chip interconnect (which may affect the position at which the token bit should start in each shift register when processing the first received input data unit of a network packet). For example, the program code implementing the design generating method could include equations or program sub-routines for calculating the positions of the additional storage circuits for a given set of parameters specifying the first and second data sections, or alternatively a lookup table may be implemented to look up the parameters to be used for certain combinations of first and second numbers of data sections (and header sizes if necessary).

The information indicating the different arrangements of the storage circuits in the respective circular shift registers need not be the only parameter of the resizing circuitry generated in the design generating method based on the first and second numbers of data sections. Other parameters that could be selected at this point may include the size of the buffers, and the total number of storage elements to be included in each circular shift register. Also, the tap positions where the multiplexer selection lines are coupled to the outputs of the first subset of storage circuits within a given circular shift register can be selected based on the relative first and second number of data sections.

Hence, various parameters of the resizing circuitry can be selected based on the first and second numbers of data sections and these parameters can be recorded in the electronic design file so that when an integrated circuit is subsequently made to that design then the resizing circuitry can be generated to have appropriate layouts for the particular sizes of input and output data units to be resized.

A non-transitory storage medium may be provided which stores a computer program for controlling this electronic design method.

Hence, by providing software to automatically generate a bespoke configuration for the resizing circuitry based on the design specification data, this can make it much easier for an interconnect design meeting certain functional performance requirements to be developed without needing engineers to explicitly configure the design manually. This can make design of integrated circuits more efficient.

FIG. 1 schematically illustrates an example of a data processing system 2 (e.g. an integrated circuit or system-on-chip) having one or more interconnects 4, 6 for routing data access requests between requesting nodes and destination nodes and routing the responses to such data access requests from the destination nodes to the requesting nodes. In this example the system 2 includes a number of master devices, such as: one or more central processing units (CPUs) 7 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 7 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 7, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target destination node selected based on the target address specified by the request, and for routing of the responses back to the requesting node. In the arrangement shown in FIG. 1, the system interconnect 6 does not need to take responsibility for management of coherency between cache data in respective masters. However, in other examples, instead of providing a separate cache coherent interconnect 4 and system interconnect 6 as shown in FIG. 1, a single interconnect similar to the system interconnect 6 could be provided which connects each of the master and slave devices and also manages cache coherency.

In this example, the system interconnect 6 is implemented as a network on chip (NoC) which comprises a number of routers 44 for coupling a number of master interfaces 46 (from which data access requests, including read and write requests, can be received from respective master devices 7-22) to a number of destination interfaces 48 (for outputting the requests to respective destination devices 26-36). Each master interface 46 (also known as an ingress port, IP, or source endpoint) is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 (also known as egress ports, EP, or destination endpoints) may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnect 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Although FIG. 1 shows an example of a network for routing signals between master and slave devices within an integrated circuit, in other examples the devices connected by the interconnect may not have a master-slave relationship, but instead the devices could be connected by peer-to-peer connections. Also, in some examples some requests routed by the network may target a destination node within the interconnect itself, such as points of coherency or caches, rather than targeting a destination node outside the interconnect.

Figure 2:
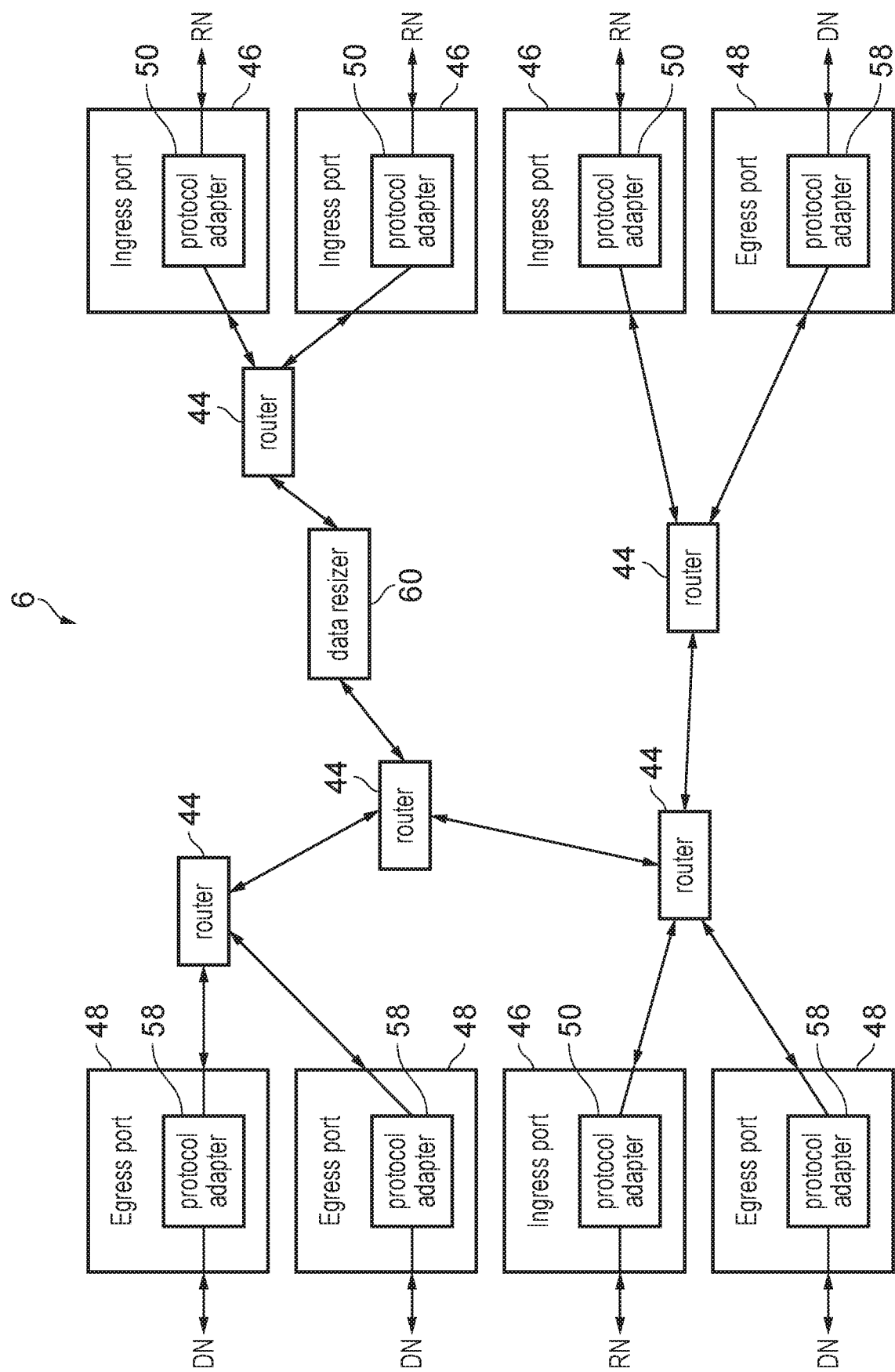
FIG. 2 shows an example of network components of the on-chip interconnect, including resizing circuitry for resizing data units transferred between nodes of the integrated circuit.

FIG. 2 shows an example of components on the network on chip (NoC) 6 in more detail. The NoC 6 comprises a number of components which can be combined in different layouts and arrangements depending on the particular arrangement of master devices and destination devices which are to be connected by the NoC 6. For example this may include any of the following components (it will be appreciated that these are not the only kinds of network components that could be included—other examples could include clock/voltage domain crossing components or redundant components provided for functional safety):

Ingress Port (Source Endpoint) 46

The ingress port receives data access requests from a requesting node coupled to the ingress port. For example the ingress port may act as one of the master interfaces 46 shown in FIG. 1. The ingress port 46 may decode a target address as specified by the data access request received from the requesting node to identify which egress port 48 should be selected for handling the request, and generates routing information for controlling the routing of the request across the NoC to the selected egress port 48. Also, as requests routed within the NoC 6 may use a different protocol to the protocol used by the requesting nodes for the data access requests, the ingress port may include a protocol adapter 50 for translating the request into the transport protocol used on the network. The ingress port 46 transmits the translated packets onto the network accompanied by routing information identifying how network packets corresponding to the request should be routed across the NoC. The ingress port 46 may also provide other functions such as managing resource allocation for particular requests, and controlling a quality of service level provided for requests from different sources so as to balance the competing needs of different master devices for bandwidth on the network. For example the ingress port 46 may have various buffers for buffering tracking information relating to requests and buffering responses to the requests. The ingress port 46 may control allocation of resource and issuing of requests based on availability of space in the buffers, and based on the quality of service requirements (e.g. providing a limit to the number of currently outstanding transactions that can be pending at a given time, or a limit to the number of transactions from a given requesting mode which are serviced within a given period).

Router 44

Each router 44 is responsible for routing packets received from one component of the NoC 6 and selecting which other component the packet should be directed to, based on the routing information specified by the packets which has been appended to the packet by the ingress port 46 at which the corresponding request originated. The particular arrangement and number of routers 44 that are provided may depend on the particular system requirements. For example, if ingress and egress ports are separated by a large distance on the integrated circuit then more routers may be required to provide sufficient repetition of packets to maintain signal level when the packets reach their destination. Also the topology in which the routers are connected may be selected based on expected bandwidth requirements for particular pairs of ports 46, 48. Although not shown in the example of FIG. 2, it is possible for some pairs endpoints 46, 48 may be able to be connected by the routers 44 so that a network packet can be routed between the pair of endpoints 46, 48 by more than one alternative transmission path.

Egress Port (Destination Endpoint) 48

The egress port 48 receives the network packets representing data access requests that were generated by the ingress port 46 and routed across the NoC via the routers 44. The egress port 48 has a protocol adapter 58 for translating the transport protocol of the network packets back into the protocol used by the destination node to which the egress port is connected. Some forms of request may not require a response from the destination node. However, for requests which do require a response (e.g. a read response, a write response or both), when a response to a data access request is received from the destination node which has serviced the data access request, the responses can be adapted for the transport protocol of the network by the protocol adapter 58 in the egress port 48 and then output onto the network by the egress port 48. In some cases, the response packets may be routed back to the ingress port 46 which received the original data access request which triggered those responses, e.g. along a corresponding path to the one taken by the data access request packets but in the reverse direction, or on a different path. In other cases, the response packets may be routed to a different ingress port as they may sometimes need to be provided to a different requesting node to the requesting node that issued the original request (e.g. due to a change in coherency state in the caches of the respective masters). The protocol adapter 58 may append routing information specifying the route to be taken by the response packets. When these response packets are received at the ingress port 46, the protocol adapter 50 converts them into the responses expected by the requesting nodes and forwards them onto the requesting node.

Note that in some examples the functions of the ingress/egress ports may also be handled at a network bridge component (at a boundary between two network portions), so that the network bridge may effectively act as both an ingress port and an egress port for at least some purposes. For example, the network bridge component could be at a boundary between clock domains or voltage domains.

Data Resizer 60

It may be needed to resize data units (flits) being transmitted across the network when being provided from one component to another. Network packets may be divided into data units called "flits", where a "flit" is a "flow control digit", representing the smallest unit of data for which flow control (selection of the path taken by the flit across the network and/or the timing of transmission of the flit) is controlled independently from other flits. Hence, one flit of a given network packet could be routed across a different path to another flit in the same packet. At the resizer 60, a packet comprising a number of input flits of larger size (having a larger number of data sections) could be mapped to a packet comprising a greater number of flits of a smaller data size (fewer data sections). Alternatively, a packet comprising smaller flits could have its flits combined or repartitioned into a smaller number of flits of greater size.

If the resizing is such that the number of input flits and the number of output flits follows a many-to-one or one-to-many relationship then the resizer 60 may act as a serialiser-deserialiser.

However, as discussed further below, resizers 60 can also provide an L:M resizing of data flits where both L is the number of data section in each input flit and M is the number of data sections in each output flit and L and M are different integers both greater than 1. The resizer 60 can support remapping where the ratio L/M does not correspond to an exact power of 2.

Figure 3:
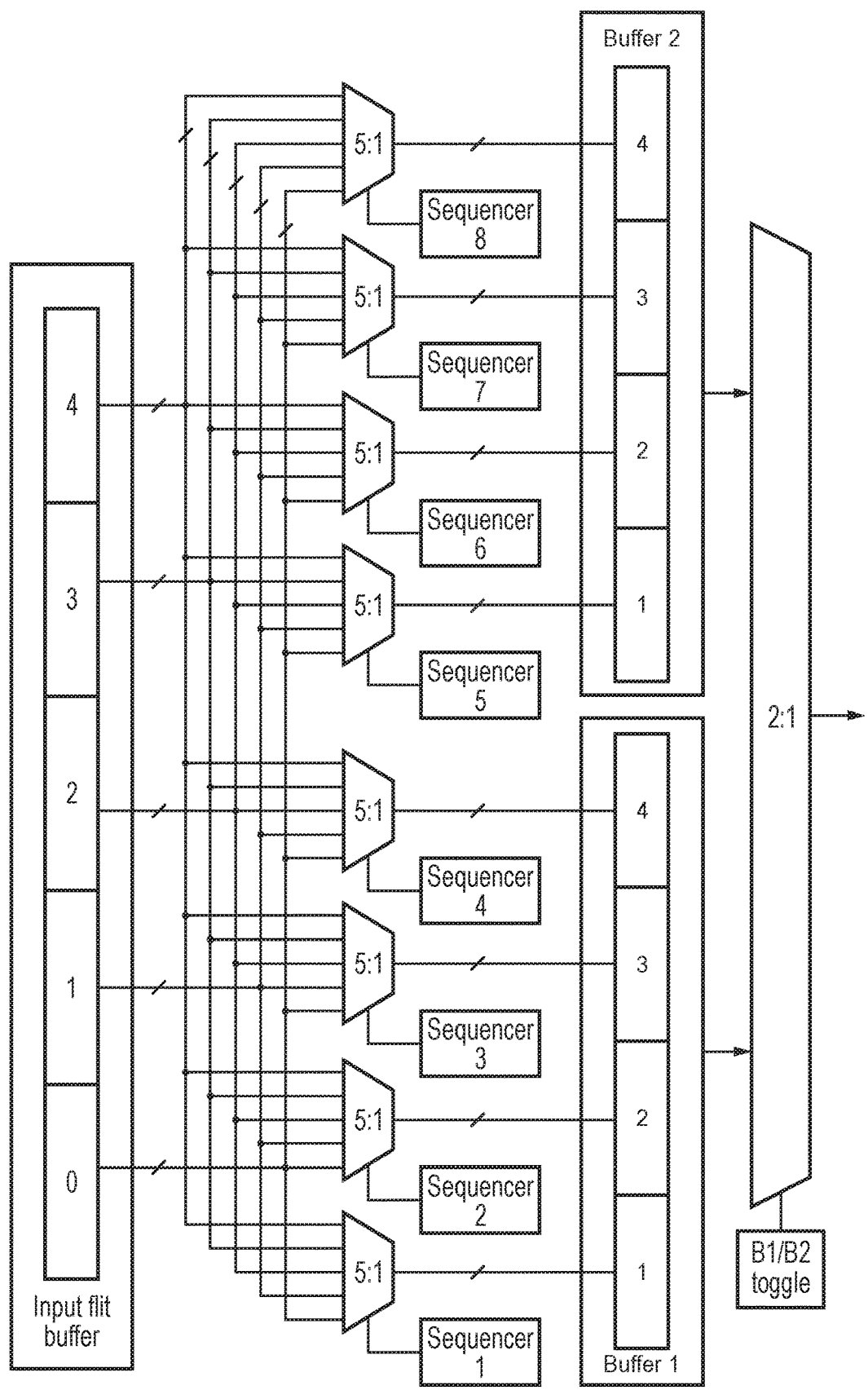
FIG. 3 shows an example of the resizing circuitry comprising a buffer and circular shift registers.

FIG. 3 shows an example of the resizer 60 for 5:4 resizing of input flits having 5 data sections to output flits having 4 data sections (i.e. L=5, M=4). The resizer 60 comprises an input buffer comprising five (L) buffer entries to receive the data sections of a received input flit. Two output buffers are provided, each output buffer having M buffer entries to buffer M data sections forming an output flit to be transmitted downstream on the interconnect network. By providing two output buffers, this can reduce delays in outputting the output flits as there is buffer space for writing data sections of a next output flit in the same cycle as a cycle in which a previous output flit is still being written. Hence, for this particular example with M=4 there are 8 output buffer entries in total, 4 in each output buffers (and the number of output buffers N=2).

Selection circuitry (comprising a set of L:1 multiplexers, i.e. 5:1 multiplexers for this example) is provided for controlling writing of data sections from the input buffer to the buffer entries of the output buffers. Each buffer entry in the output buffers is associated with a corresponding multiplexer of the selection circuitry, and a corresponding sequencer which controls the timing of selection at the corresponding multiplexer. As shown in FIG. 3, sequencers 1 to 4 correspond to buffer entries 1 to 4 in output buffer 1, and sequencers 5 to 8 correspond to buffer entries 1 to 4 (also referred to as entries 5 to 8 later) in output buffer 2.

For sequencer X (where X is between 1 and 8), the corresponding multiplexer receives as inputs the data sections in the L entries of the input buffer. In each cycle, the multiplexer can either select for output one of the L data sections received from the input buffer, in which case the output buffer entry corresponding to sequencer X is overwritten with the selected input data section, or select for output none of the L data sections, in which case the buffer entry corresponding to sequencer X retains its previous value and is not overwritten in that cycle. The sequencer generates a set of selection signals which control the timings of cycles when none of the input data sections is selected, and cycles when a particular input data section is selected. Each sequencer may follow a cyclic pattern so that the input data sections are written, in order, into successive buffer entries of the output buffer so that (provided there are enough data sections in the input flits of the current network packet remaining), the output flits can be fully populated with data sections without gaps, to make more efficient use of available network bandwidth. For the 5:4 example of FIG. 3, the cyclic pattern followed by each sequencer is the same, but starting at different cycles within the pattern, as discussed further below.

The resizer also comprises an N:1 multiplexer (where N is the number of output buffers, i.e. a 2:1 multiplexer in this example) which selects, for output to the downstream network, the output flit formed in one of the output buffers. Control logic for the N:1 multiplexer toggles the selection of the multiplexer to alternate between the respective output buffers. Hence, in this example the output multiplexer alternately selects the output flit in buffer 1, then buffer 2, then buffer 1, then buffer 2, etc.

Figure 4:
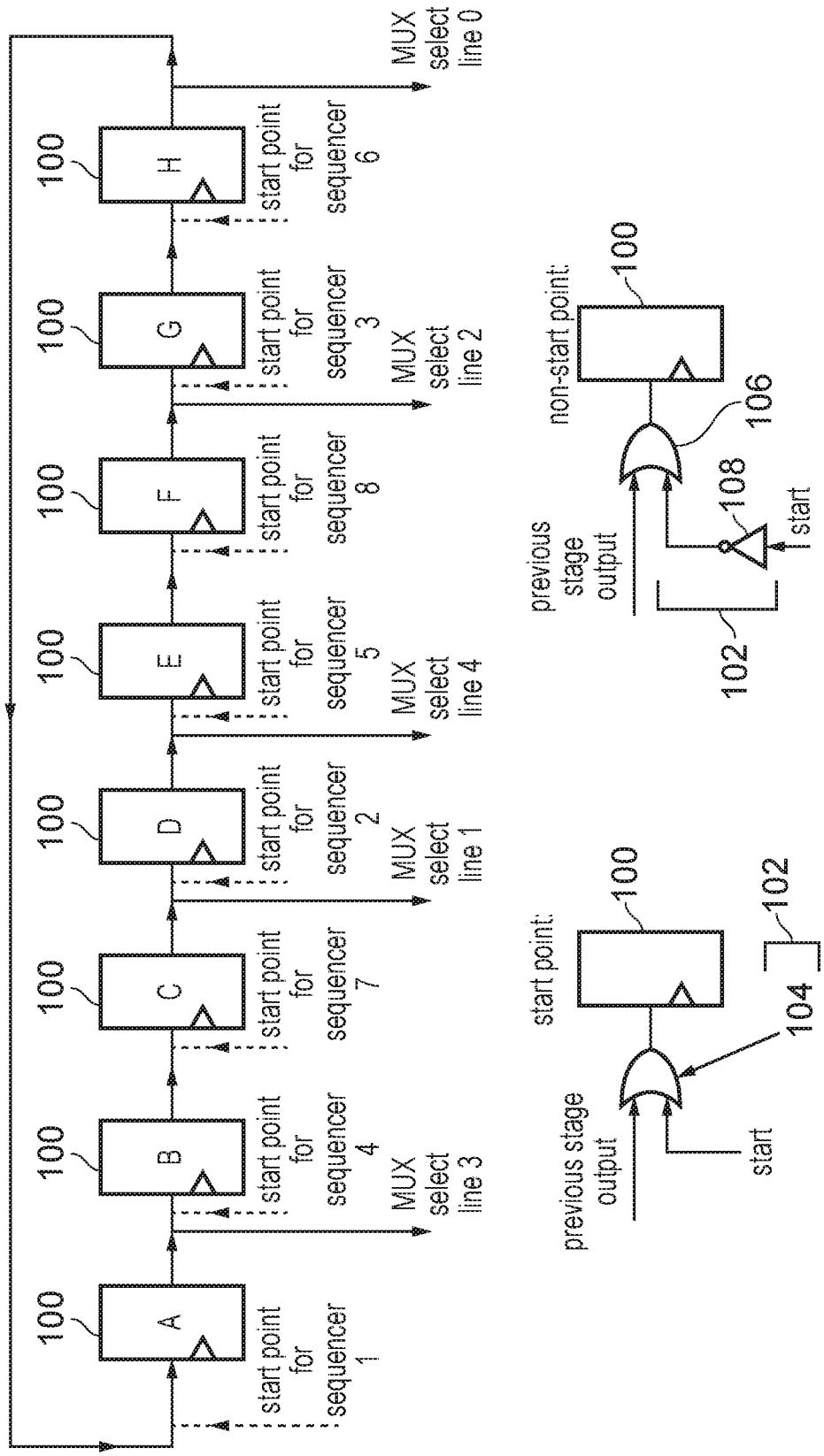
FIG. 4 shows a shift register layout for one of the circular shift registers for controlling a sequence with which input data sections are to be written to a given buffer entry of the resizing circuitry.

FIG. 4 shows an example of one of the sequencers, which could be any of the sequencers 1 to 8 shown in FIG. 3. Each sequencer comprises a circular shift register, which includes a number of storage circuits 100 (e.g. flip-flops, latches or registers) connected in a ring so that the value stored in a given storage circuit 100 in one cycle is transferred to the following storage circuit 100 in the ring for the next cycle. Hence, the value stored by one storage circuit 100 in cycle X is captured as an input by the next storage circuit 100 in the ring in cycle X+1.

When starting resizing for the first input flit of a new network packet, control logic 102 initialises the state of the shift register so that the shift register stores a 'onehot' encoded value which comprises a single bit equal to binary 1 and all the other bits equal to binary 0. The '1' bit represents a "token" bit which is passed from storage circuit to storage circuit between cycles, and controls which input section (if any) is selected by the corresponding multiplexer of the resizer.

The control logic 102 comprises a portion of logic coupled to the input of each storage circuit 100, but for conciseness the control logic 102 is not shown in detail for each storage circuit 100 in FIG. 4. Instead, the bottom part of FIG. 4 shows an example of the control logic 102 for the "start point" storage circuit which is to be initialised with the '1' bit and the control logic 102 for one of the remaining "non-start-point" storage circuits which are to be initialised with the '0' bit. Each sequencer has the "start point" storage circuit 100 at a different position around the ring. In this example, the start point storage circuits for sequencers 1 to 8 are the storage circuits labelled A, D, G, B, E, H, C and F respectively. These start points are shown in the dotted lines in FIG. 4 (the dotted lines signifying that each sequencer only has one start point storage circuit, but that the start points are at different positions in each sequencer).

For the start point storage circuit 100, the control logic 102 may comprise an OR gate 104 to combine the previous stage output value provided by the preceding storage circuit in the ring with a 'start' signal which is 1 in the cycle when resizing is to start for a new network packet and is 0 in other cycles. Hence, in the start cycle a '1' input is provided to the start point storage circuit 100, and in subsequent cycles other than the start cycle a '1' input will be provided to the start point storage circuit if a '1' is output from the preceding storage circuit in the ring.

For a non-start-point storage circuit 100, the previous stage output from the preceding storage circuit in the ring is combined (by AND gate 106) with the inverse of the 'start' signal (generated by NOT gate 108), so that in the start cycle the non-start-point storage circuit 100 is initialised to '0' and in subsequent cycles the non-start-point storage circuit 100 receives a '1' when the output from the preceding storage circuit 100 is '1'.

It will be appreciated that the particular example of control logic 102 shown in FIG. 4 is just one way of initialising the shift registers, and other examples could use a different form of control logic 102.

Each sequencer shift register includes a first subset of storage circuits 100 (labelled A, C, D, F, H in this example) which have their output coupled to a corresponding multiplexer selection line, which when driven to '1' controls the corresponding multiplexer to select the input data section at a corresponding position within the input flit buffer. The multiplexer selection lines connected to the outputs of storage circuits A, C, D, F, H correspond to input buffer entries 3, 1, 4, 2 and 0 respectively. This means that, for example, when the token bit '1' is stored in storage circuit A, the corresponding multiplexer selects the data section from input buffer entry 3 to be written to the corresponding output buffer entry, and when the token bit is stored in storage circuit C, the multiplexer selects for writing to the output buffer entry the data section from input buffer entry 1, and so on.

The shift register also includes a second subset of storage circuits 100 (labelled B, E and G in this example) which do not have any of the multiplexer selection lines coupled to their output signals. This means that, in a cycle when the token bit '1' is stored in one of the second subset of storage circuits 100, none of the input data sections is selected by the multiplexer for writing to the corresponding output buffer entry. The second subset of storage circuits act as "silent" storage circuits, and reflect the fact that as the total number of output buffer entries (N*M=8) is greater than the total number of input buffer entries (L=5) in this example, then in each cycle there will be some output buffer entries that cannot be written.

It will be appreciated that, while this embodiment represents the token bit as '1' and the non-token bits as '0', all signals could be inverted and so it would also be possible to represent the token bit as '0' and non-token bits as '1'.

Figure 5:
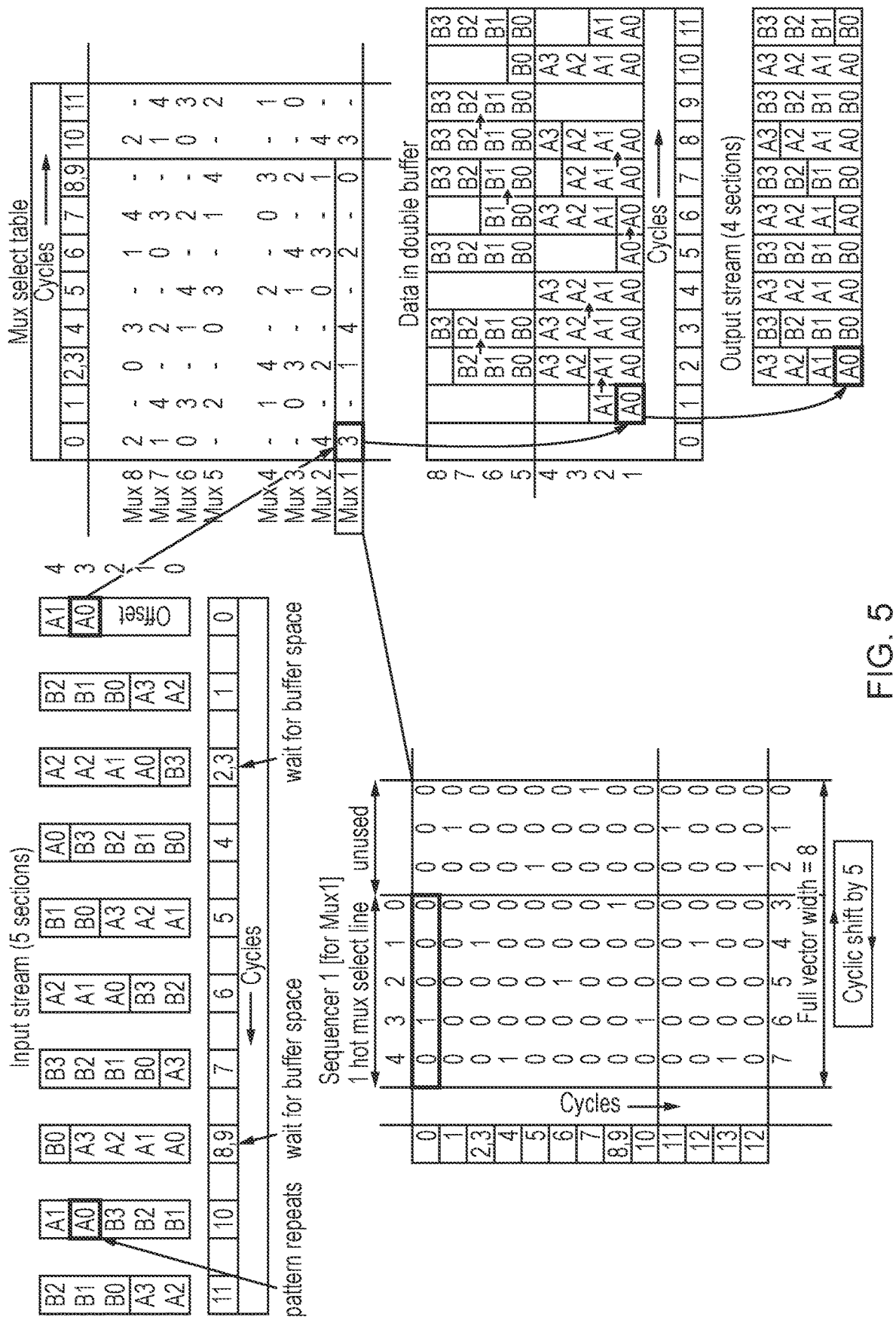
FIG. 5 illustrates timing of sequencing control for the respective circular shift registers.

FIG. 5 shows how the respective sequencers 1 to 8 control the selection circuitry (5:1 multiplexers) to select which input data sections to write to the output buffers, and also shows the timing of output of output flits from the output buffers.

As shown in the top left of FIG. 5, a portion of the first input flit marked "Offset" may not need to be mapped to corresponding data sections of the output flits, e.g. because it provided control information used for control purposes which is no longer necessary downstream of the resizer. Hence, the first meaningful data section in the input flit which needs to be transmitted downstream may not be at the start of the first input flit. While this example shows a control (header) portion comprising three data sections, other examples could have different sized control portions.

Subsequent to the control/header portion, subsequent groups of four input sections are alternately allocated into output buffer 1 or output buffer 2, with the data sections remaining in the same order and no gaps being formed within the output data sections. Hence, the next four data sections A0, A1, A2, A3 in the last two data sections of input flit 0 and the first two data sections of input flit 1 are written to buffer 1 and mapped to a first output flit, the next four data sections B0, B1, B2, B3 in the final three data sections of input flit 1 and the first data section of input flit 2 are written to buffer 2 and mapped to a second output flit, and so on alternating between buffers 1 and 2.

The multiplexer select table at the top right of FIG. 5 shows the repeating pattern of cycles in which each input data section is selected by a given multiplexer (with the 'silent' cycles marked with a dash ("-") being the cycles when the token bit is in one of the second subset of storage circuits and so no data section is output by the corresponding multiplexer). It can be seen from the multiplexer selection table that each multiplexer follows the same alternating sequence 3, -, 1, 4, -, 2, -, 0 (but initialised at different start points), which is why a symmetric arrangement of the sequencer shift registers can be used as shown in FIG. 4, with the first/second subsets of storage circuits at the same relative positions in each shift register, but control logic 102 initialising the token bit at a different start point for each shift register.

The bottom left of FIG. 5 shows the sequencer timing for the sequencer 1, which corresponds to the multiplexer 1 selecting which input data section (if any) is written to buffer entry 1 of output buffer 1. The 'onehot' value stored across the storage circuits 100 of sequencer 1 can be seen as a "shift vector" which (in the case where L<N*M) has a length (number of bits) corresponding to the total number of output buffer entries (N*M) and where (assuming the positions in the vector corresponding to each multiplexer select line are represented by elements in the left-hand portion of the vector marked 4, 3, 2, 1, 0 in FIG. 5 and the positions in the vector corresponding to "silent" cycles are in the "unused" right-hand portion of the vector), the transition from one cycle to the next corresponds to a right shift by L elements of the vector (where L is 5 in this example). This shift by 5 per cycle reflects the fact that 5 input data sections can be read per cycle from the input flit buffer, and so the first data section of a next input flit should be allocated to the output buffer entry that is 5 positions further on cycling around the output buffers. Each other sequencer 2 to 8 would proceed according to the same cyclic shift of the shift vector as sequencer 1, but starting at a different initial position.

While the sequencer 1 table of FIG. 5 shows a cyclic shift of 5 per cycle due to ordering the elements of the shift vector in order of the corresponding input flits, in practice for implementing the corresponding shift registers it is more efficient to reorder the "tap" positions of the multiplexer select lines to follow the cycle shown in the "mux select table" in the top right of FIG. 5, so that the token bit only needs to move along one storage element per cycle. It can be seen from comparing the "mux select table" and FIG. 4 that the start points and ordering of the multiplexer select lines and "silent" elements not having their output connected to a multiplexer select line corresponds to the cyclic sequences shown in FIG. 5.

The shift registers do not need to be advanced in every cycle. As shown in FIG. 5, there are some cycles in which it may not be possible to advance the shift registers (e.g. the clock for triggering output of the token bit from one storage circuit to the next can be suppressed for a cycle). This is because, as shown in the representation of the data in the output buffers following each cycle as shown in the bottom right of FIG. 5, an output flit can be read out from the output buffers once it is fully populated with storage elements, and so in some cycles it may be needed to finish filling the remaining elements before being able to read out the next output flit. In cycles when both output buffers are full or one of the output buffers is full and not accepted downstream in the same cycle, then writing of input data sections to the output buffers does not happen for a cycle (e.g. see the wait cycles 2, 8 in FIG. 5).

Hence, FIG. 5 shows how the sequencing control enables the output stream to be fully populated with a continuous stream of data sections extracted from the input stream, even when the ratio between the number of input/output data sections per flit is not a power of 2 ratio.

The symmetric arrangement of shift registers works for the 5:4 resizing example with a header size of 3 as shown in FIGS. 4 and 5.

Figure 6:
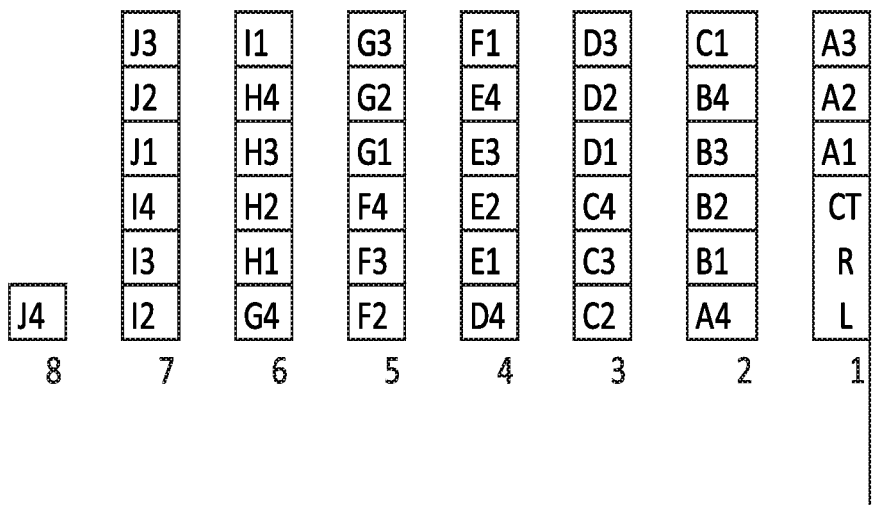
FIG. 6 illustrates an example of a convolution cycle in which a data section is overwritten in the buffer before it is able to be output as part of an output data unit.

However, FIG. 6 shows an example of a problem that arises for the sequencing when the same principle is applied to a different combination of resizing ratio and header size, e.g. L:M=6:4 with a header of 3 data sections in this example. Hence, this time one would expect that (with N=2 output buffers) the length of the shift vector should be 8 and the size of the shift between cycles is 6. As there are 6 input sections, then 6 of the output buffer entries can be written per cycle, leaving 2 buffer entries unwritten as marked by the "silent" positions in the shift vector which can be represented by the "second subset" of storage circuits 100 in a corresponding shift register. For this example, again a header portion "CTRL" is assumed to occupy the first three data sections of the first 6-section input flit, and so in the first cycle the next 3 data sections A1, A2, A3 are written to output buffer entries 1, 2, 3 respectively.

However, in cycle 1, if the shift vector is rotated right by 6 positions, while this would correctly cause the first 5 elements A4, B1, B2, B3, B4 of the second input flit to be written into output buffer entries 4, 5, 6, 7, 8 respectively, the rotation by 6 positions also causes a '1' to shift back into the position in the shift vector corresponding to the final input data section, which would control the multiplexer corresponding to buffer entry 1 to write the input data section C1 extracted from the final position in the second input flit to buffer entry 1, which would overwrite previously written input section A1 which was not able to be read out as an output flit yet because it was still waiting for the final data section A4 of that output flit to be written. This problem arises because the number of data sections per input flit (6) is large enough that it can span across 3 separate output flits, and as there are only 2 output buffers provided, it is not possible to write all of the data sections of the input flit without overwriting some previous data in all the output buffers, which would lead to loss of data if any of those output buffers still needs to be read out as an output flit. More generally, this problem can arise, for a system providing N output buffers and resizing from L-data section input flits to M-data section output flits, when L is greater than ((N−1)*M)+1 and L is less than N*M. A cycle in which this early overwriting of a previously written input data section occurs may be referred to as a "convolution cycle".

Figure 7:
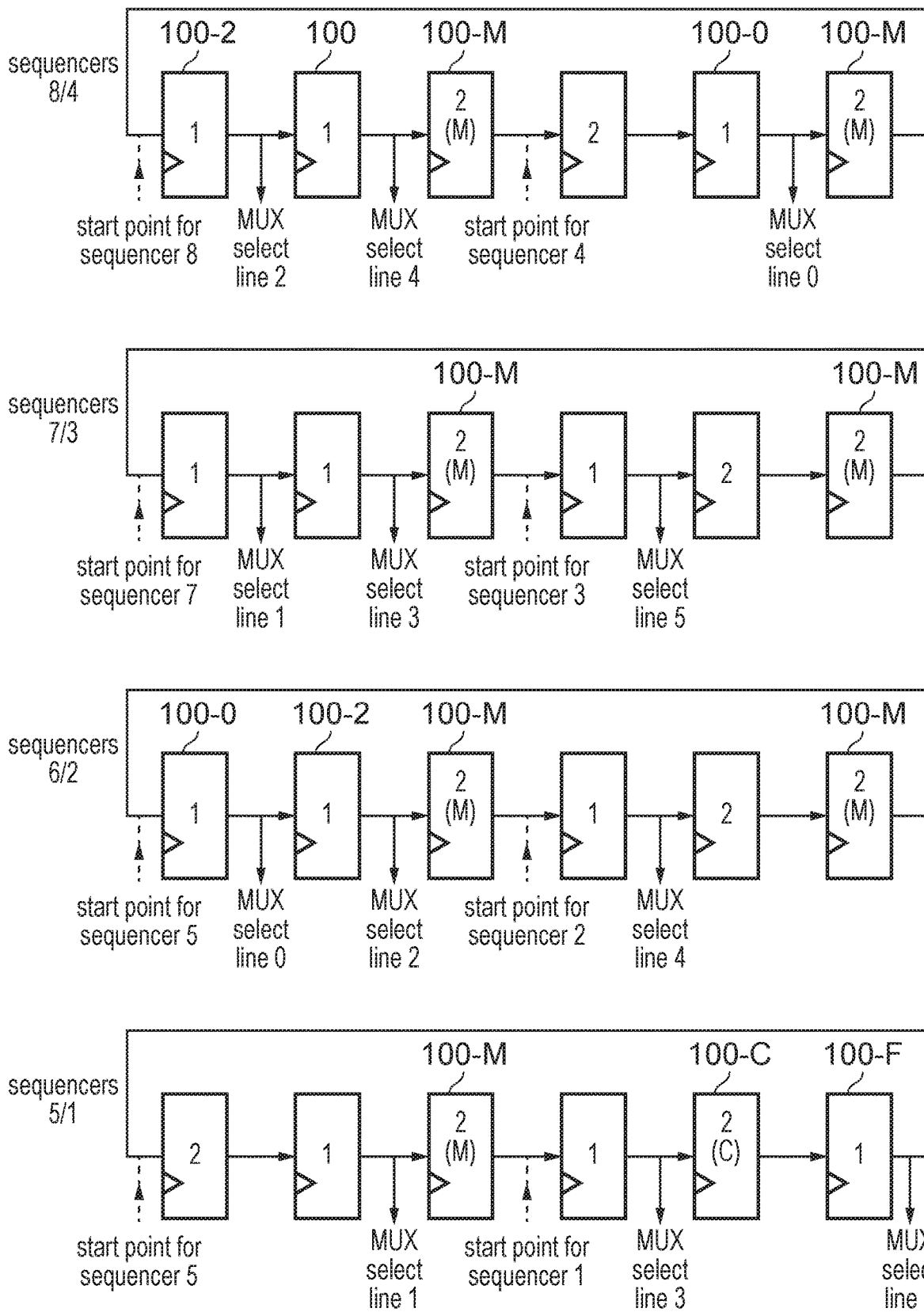
FIG. 7 illustrates an example of shift register layouts for different circular shift registers, including additional convolution-avoidance storage circuits and masking storage circuits for preventing the convolution problem shown in FIG. 6.

As shown in FIG. 7, the convolution problem can be addressed by adding some additional 'silent' storage circuits 100 of the second subset into the ring of the respective circular shift registers, but with those additional storage circuits 100 at different positions for different shift registers, so that the sequencers 1 to 8 have shift registers with different relative arrangements of the first/second subsets of storage circuits 100. The layout of the respective shift registers is explained with reference to the worked example of FIGS. 8 to 12 which show the operation of the shift registers (and hence the multiplexer selection of sequencers 1 to 8) over a number of cycles. For ease of understanding, the storage circuits of the first subset are labelled with a T and the storage circuits of the second subset are labelled with a '2' in FIG. 7.

As explained above, the sequencers represent a shift vector which (for the case where L<M*N) has a vector width corresponding to M*N and which shifts position by L per cycle. Hence, one would expect each shift register to comprise M*N storage circuits 100, i.e. 8 storage circuits in this example. However, as can be seen from comparing FIGS. 8 and 9 with FIGS. 10 and 11, in practice, the sequential patterns of cycles for the 6:4 resizing example repeats more frequently than every 8 cycles and so it is possible to use shorter shift registers with fewer than 8 storage circuits 100.

In this example, the sequencers form 4 pairs of sequencer shift registers which have their storage circuits in the same relative order within each of the pair of shift registers, but with the two shift registers in a given pair having the start storage circuit at different positions relative to each other. The pairs of shift registers with the same layout (other than start position) are: sequencers 8 and 4; sequencers 7 and 3; sequencers 6 and 2; and sequencers 5 and 1. However, the sequencers of one pair have their second subset of storage elements at different relative positions relative to the first subset of storage elements corresponding to certain input positions, compared to in another pair of sequencers. For example, note that between the storage circuit 100-0 which causes multiplexer select line 0 to be asserted and the storage circuit 100-2 which causes multiplexer select line 2 to be asserted, in sequencers 8 and 4 there is one storage circuit 100-M of the second subset between those storage circuits 100-0, 100-2 in the ring. In contrast, sequencers 6 and 2 have no storage circuits of the second subset between storage circuits 100-0, 100-2 corresponding to multiplexer select lines 0 and 2. Similarly, for sequencers 7/3, there are two storage circuits of the second subset between the first subset storage circuits corresponding to multiplexer select lines 5 and 1, but in sequencers 5/1 there is only one storage circuit of the second subset positioned between the first subset storage circuits corresponding to multiplexer select lines 5 and 1. Other differences can also be seen from FIG. 7.

FIGS. 8-12 show how this can help to address the convolution problem. FIGS. 8-11 show step by step cycle diagrams showing the progression of the token bits around the respective shift registers, while FIG. 12 illustrates the data formed in the output buffers and the output of output flits from the output buffers, as well as summarising the sequencer cyclic patterns for each sequencer as shown through cycles 0 to 11 in FIGS. 8 to 11.

As shown in FIG. 8, it is again assumed that the input stream of flits (data units) has a control header occupying the first 3 data sections of the first input flit, so that the first non-header data section A1 is to be written to buffer entry 1 in the start cycle 0. Hence, the sequencers are initialised so that in the first cycle, the '1's are in the positions shown in the table for cycle 0 in FIG. 8, e.g. the '1' token bit for shift register '1' is in the storage element whose output selects multiplexer selection line 3 so that input flit data section A1 at position 3 within the first input flit is written to output buffer entry 1. Hence, in cycle 0 the first three buffer entries 1, 2, 3 in output buffer 1 are written with input data sections A1, A2, A3 respectively.

In cycle 1, rotating the shift vector by 6 positions (L=6) would cause input sections A4, B1, B2, B3, B4 to be written to buffer entries 4-8 respectively, but as mentioned above for FIG. 6 this risks the convolution problem where output buffer entry 1 currently storing A1 is overwritten with C1 prematurely, as A1 cannot yet be overwritten because (as shown in the data buffer occupancy diagram at the top of FIG. 12), at the start of cycle 1 the corresponding output flit to be formed from A1, A2, A3, A4 is still waiting for A4 to be written to buffer entry 4. This convolution problem arises for the storage circuit of sequencer 1 marked 100-F in FIG. 7 which, when the token bit is stored in storage circuit 100-F, would cause the multiplexer selection line for input data section 5 to be asserted (if this was done for cycle 1, this would cause input section C1 to be written to buffer entry 1). To prevent this early overwriting, an additional "convolution-avoidance" storage circuit of the second subset, marked 100-C in FIG. 7, is inserted into the ring of sequencer 1 just before the storage circuit 100-F, to prevent buffer entry 1 being overwritten in the same cycle that buffer entries 4-8 are being written with input data sections A4 and B1-64. In the cycle timing diagram shown in FIG. 8, the presence of the token bit within the convolution-avoidance storage circuit 100-C is indicated by a "C" in position 5 for multiplexer 1, indicating that the token bit has not yet passed into the storage element of the first subset corresponding to multiplexer selection line 5, as it is instead retained in the convolution-avoidance storage circuit which has no multiplexer selection line coupled to its output.

In cycle 1, the other sequencers can function as normal with the token bit located either within one of the first subset of storage circuits which cause buffer writing to take place (for sequencers 4 to 8), or in the "unused" portion of the vector represented by storage circuits of the second subset.

Figure 8:
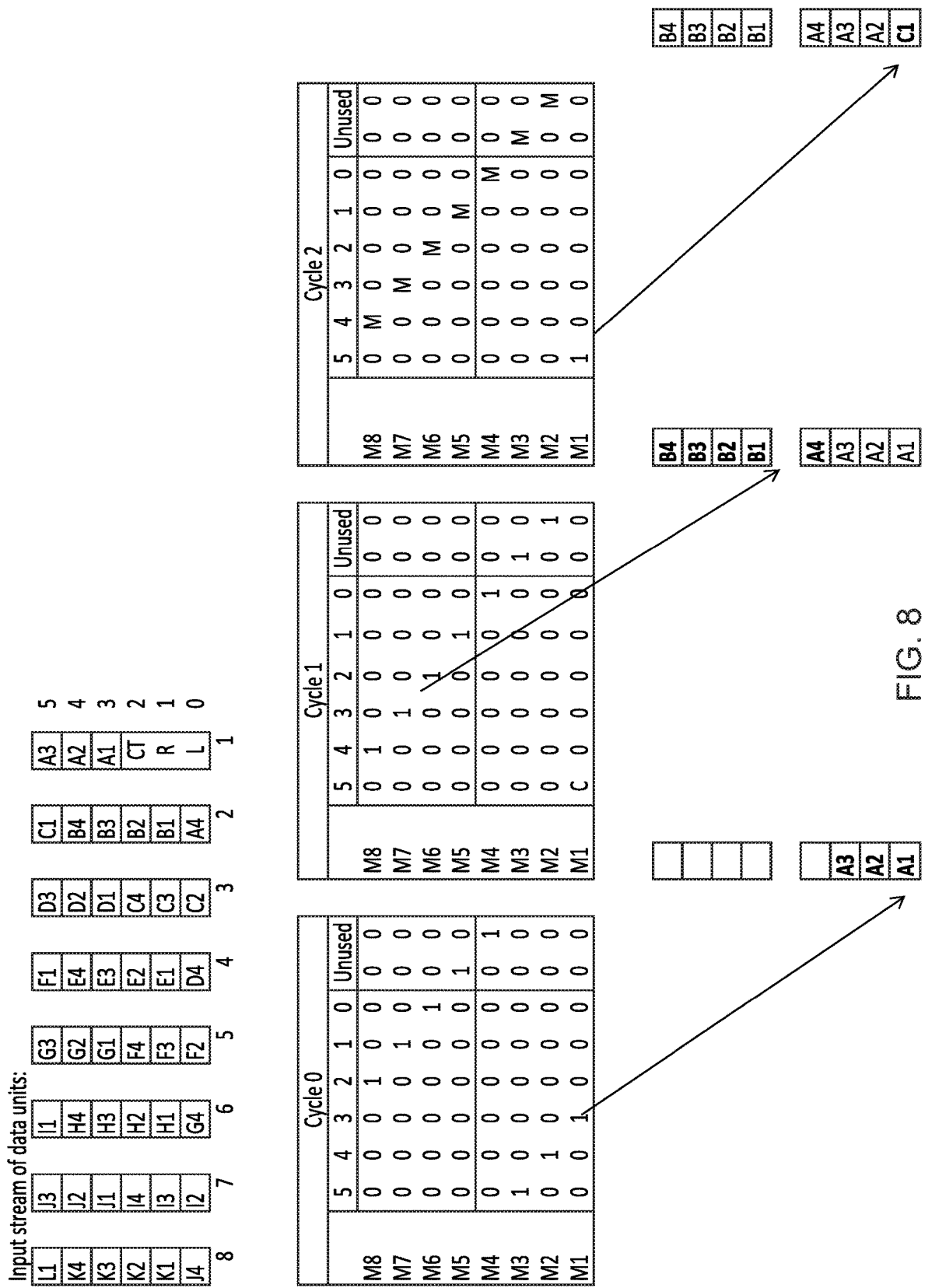

In cycle 2, for sequencer 1 the token bit passes from the convolution-avoidance storage circuit 100-C to the following storage circuit 100-F whose output is coupled to multiplexer select line 5, so that now input data section C1 at position 5 in the input buffer can be written to buffer entry 1 of the output buffers. However, as there are no remaining input data sections of the second input flit left to be written to other output buffer entries, the other sequencers have additional "masking" storage circuits added (marked as 100-M in FIG. 7) at the positions following the storage circuits which stored in the token bit in cycle 1. The cycle when the token bit is in the masking storage circuit is represented in FIG. 8 by the "M" shown for multiplexers 2 to 8 in the shift vector diagram for cycle 2.

Hence, note that cycles 1 and 2 represent a pair of cycles where, in the first cycle a first subset of the input data sections of a given input flit are written to corresponding buffer entries, and then in a second cycle the remaining input data section(s) are written, with the entire input flit having its data sections written across two separate cycles to prevent the overwriting. This is controlled by the position of the convolution-avoidance storage circuit 100-C just before the storage circuit 100-F causing the convolution cycle, and the positions of the masking storage circuits 100-M for the other sequencers, so that this avoids the need for more complex masking control logic disposed outside of the shift register ring to qualify outputs of the shift register storage circuits based on a separate masking signal. This simplifies circuit implementation.

Figure 9:
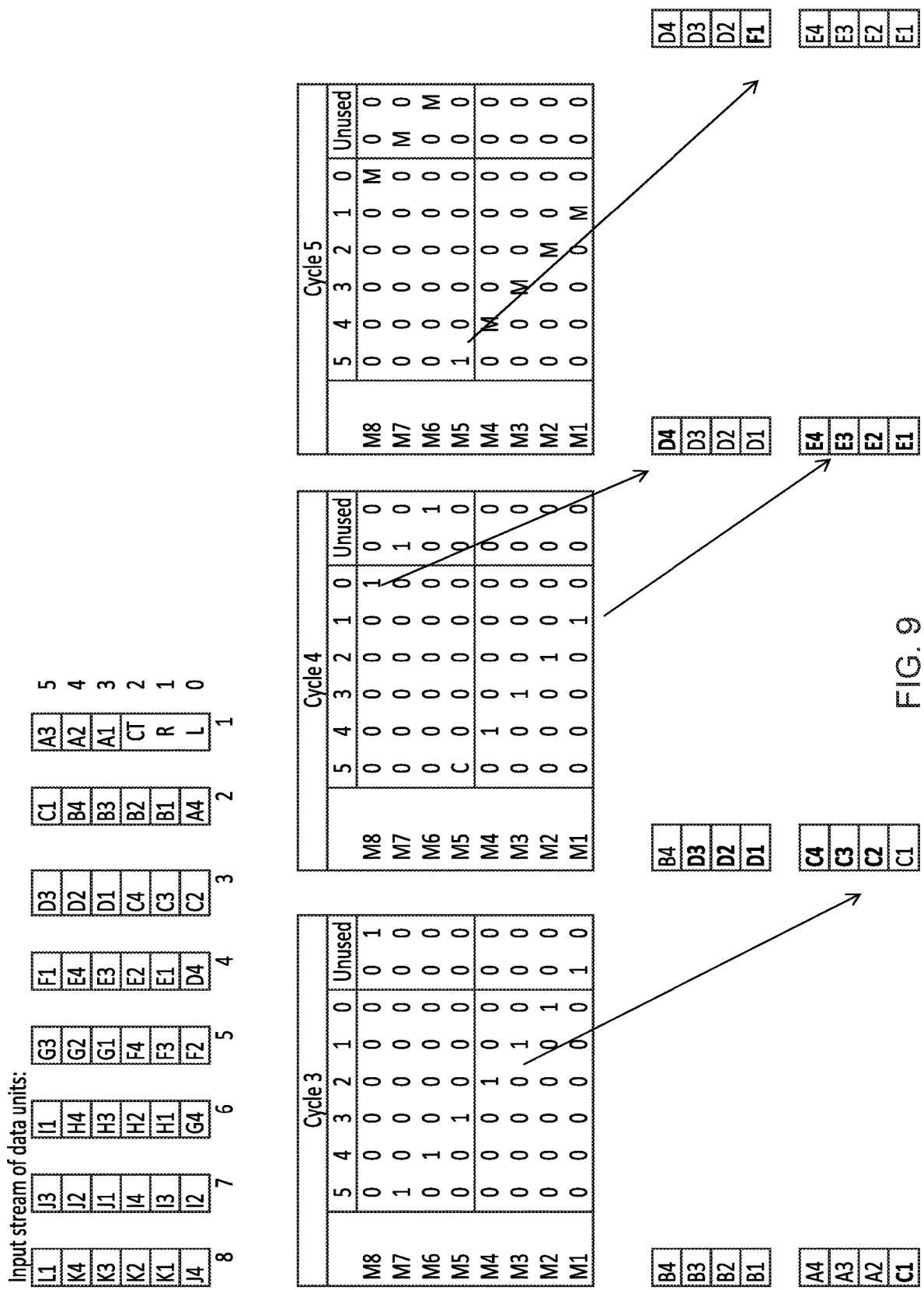
Figure 10:
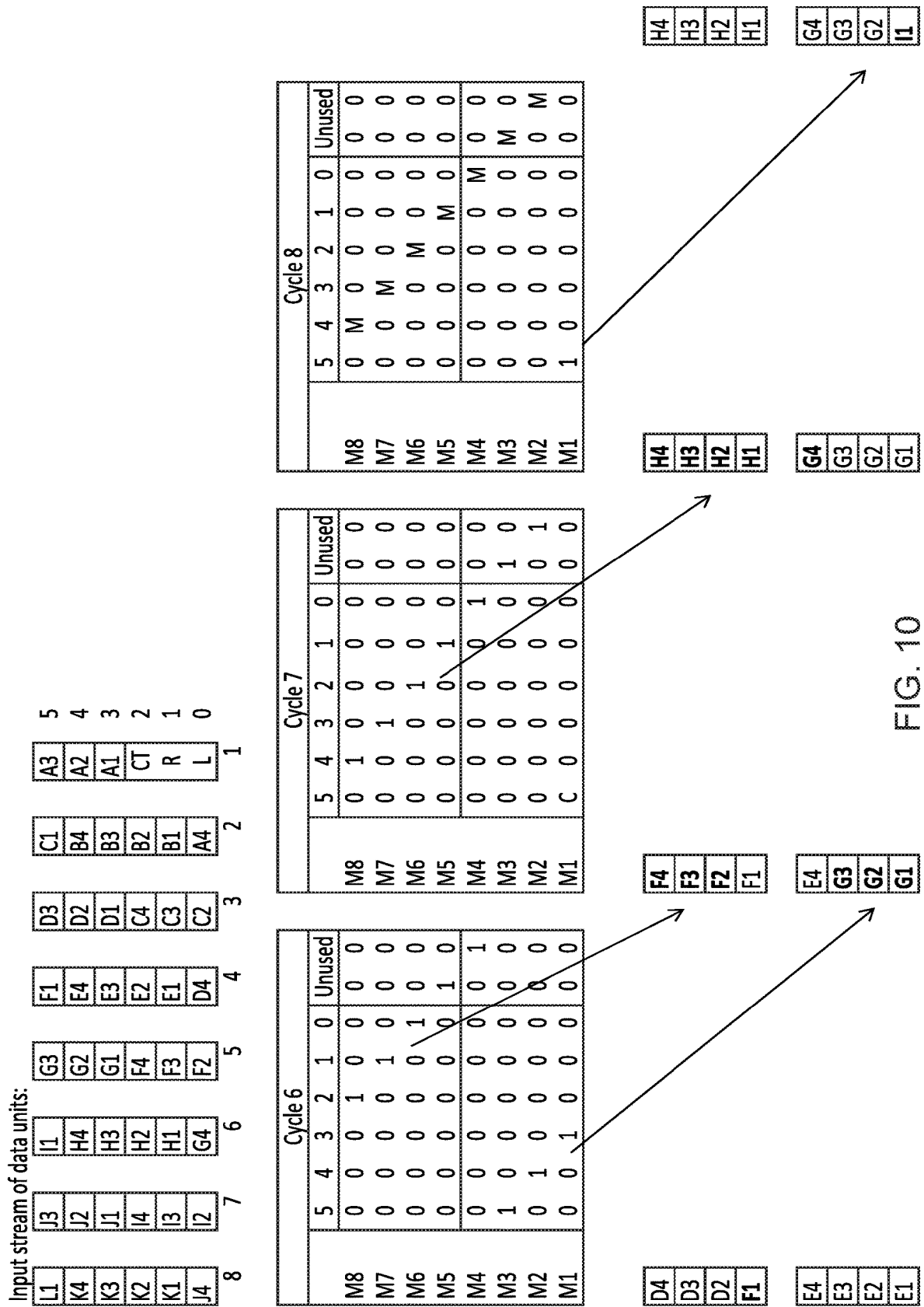
Figure 11:
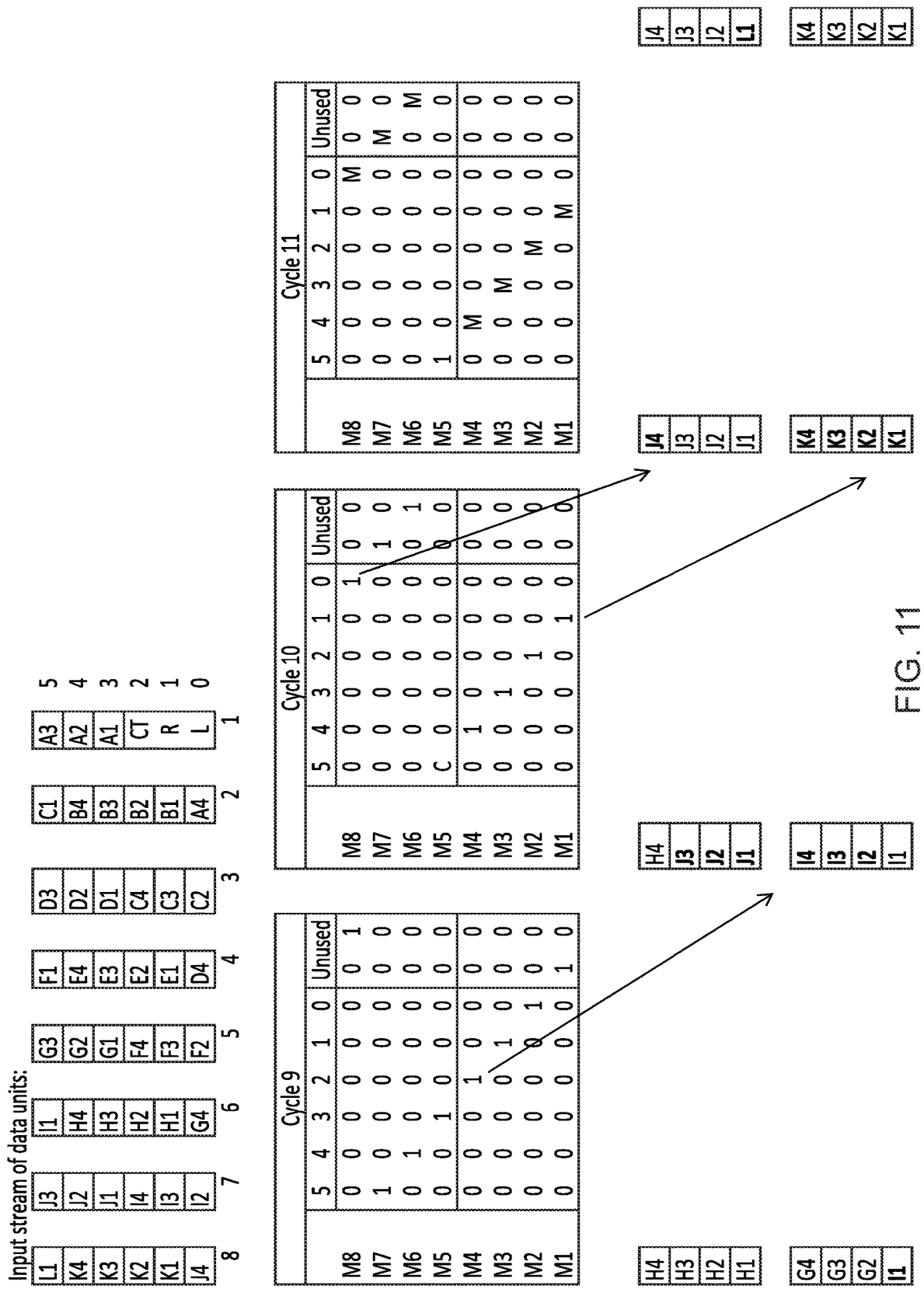

FIG. 9 shows the continued filling of output flits based on data sections from the input flits. In cycle 3, input sections C2-D3 from the third input flit can be written to buffer entries 2 to 7 of the output buffers.

In cycle 4 another convolution cycle occurs as continuing to shift the shift vector by 6 positions would cause multiplexer 5 to control previously stored input data section D1 in buffer entry 5 to be overwritten with input data section F1 in the same cycle where the final input data section D4 of output flit D1-D4 is to be written to buffer entry 8. Again, sequencer 5 can include a convolution-avoidance storage circuit 100-C just before the position of the storage circuit 100-F corresponding to multiplexer select line 5. As shown in FIG. 7, given the different start points for sequencers 5 and 1, the position of the convolution-avoidance storage circuit can be considered to be at the same relative position in sequencers 5 and 1 (just before element 100-F corresponding to input data section position 5).

In cycle 5, masking storage circuits 100-M are used to prevent the other sequencers causing buffer entries 1-4 and 8 being overwritten in the cycle when the token bit in sequencer 5 then passes into storage circuit 100-F to cause the last input section F1 of input flit 4 to be written to the output buffers.

Rotating the shift vector from the position shown in cycle 5 in FIG. 9 results in the shift vector for cycle 6 (shown in FIG. 10) having the same values as in cycle 0 (shown in FIG. 8). Hence, cycles 6 to 11 in FIGS. 10 and 11 operate in the same way as cycles 0 to 5 in FIGS. 8 and 9. As there is a 6-cycle repeating pattern, it is sufficient for each circular shift register to have 6 storage circuits as shown in FIG. 7.

The multiplexer selection table in FIG. 12 summarises the repeating pattern of alternating selections made by each multiplexer 1 to 8 based on the corresponding circular shift registers, with the positions of the first subset of data elements indicated by the number 0-5 depending on which multiplexer selection line is to be activated in that cycle, the position of the second subset of data elements indicated by a hyphen '-' for the "regular" silent storage elements corresponding to the unused portion of the shift vector, and the positions of the convolution-avoidance and masking storage circuits indicated by "C" and "M" respectively. By comparing the multiplexer selection table of FIG. 12 and the shift register layouts of FIG. 7, it can be seen that the shift registers of FIG. 7 implement the same sequence shown in FIG. 12.

It will be appreciated that the above example (for N=2, L=6, M=8) is just one example. For other input/output flit size ratios, it may be needed to include the convolution-avoidance storage elements in multiple shift registers so that the token bit is in convolution-avoidance storage elements in several shift registers in the same cycle. For example, for N=2, L=15, M=8, the convolution could wrap around to several buffer entries and so need several shift registers to be provided with convolution-avoidance storage circuits (and the other shift registers to be provided with corresponding masking storage circuits to keep the cycles of each shift register synchronised to have equal numbers of storage circuits).

FIGS. 4 and 5 show an example of a resizing ratio with L:M=5:4 and header size H of 3 for which the convolution problem does not arise, and FIGS. 6 to 12 show an example of a resizing ratio with L:M=6:4 and header size H of 3 for which the convolution problem does arise. It will be appreciated that whether the convolution cycles arise or not may depend on the particular combination of the numbers of data sections L, M in the input/output data units respectively and on the header size. Changing the header size H can affect whether or not convolution would occur for a particular ratio of L:M. For example, with the 6:4 example of FIGS. 6 to 12 if the header size H had been 2 instead of 3, then there would be no convolution problem as rotating the 8-element shift vector by 6 positions each cycle starting with a 2 position offset does not cause any cycle when the 6 data sections of one input data unit are written to 3 different output data units.

Figure 13:
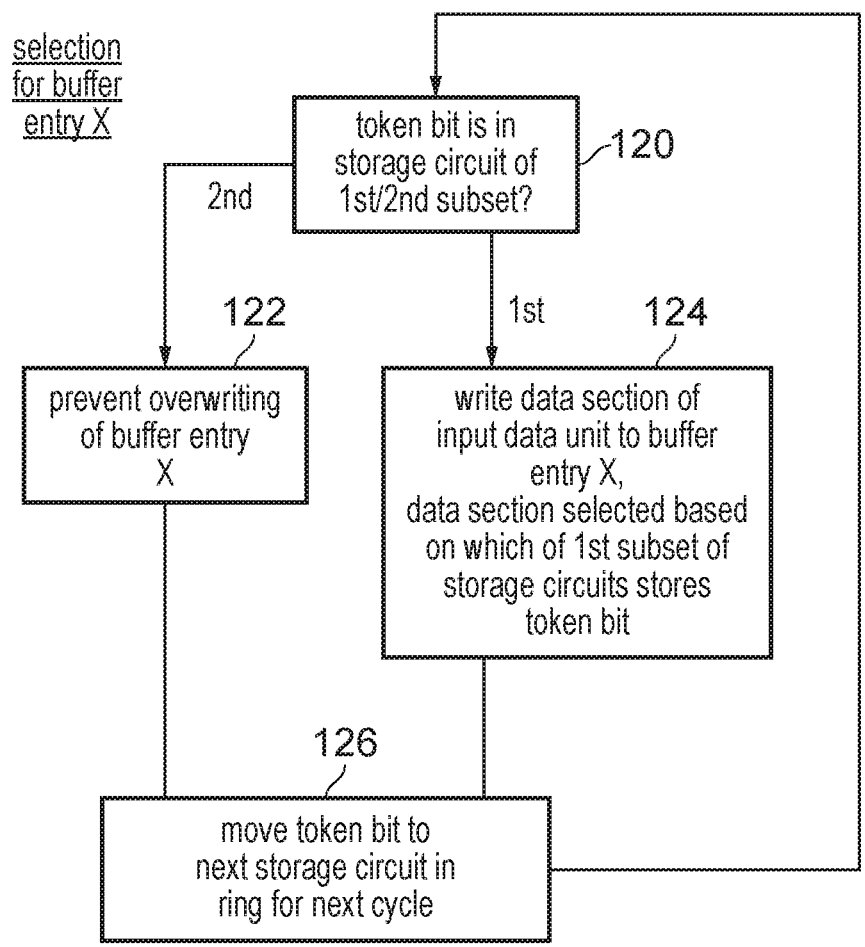
FIG. 13 is a flow diagram illustrating a method of controlling whether to overwrite a given buffer entry X in a given cycle, and if the buffer entry X is to be overwritten, selecting which data section of the received input data unit to write to buffer entry X.

FIG. 13 is a flow diagram showing a method for controlling selection by the multiplexer X corresponding to buffer entry X in the output buffers. At step 120, it is determined whether the token bit is stored in a storage circuit of the first subset or the second subset. If the token bit is stored in a storage circuit of the second subset (which could include the convolution-avoidance storage circuit 100-C or the masking storage circuit 100-M), then at step 122 overwriting of the corresponding buffer entry X in the output buffers is prevented. If the token bit is stored in a storage circuit of the first subset, then at step 124 a data section selected from the input data unit is written to buffer entry X, and the selection of the data section depends on which particular storage circuit 100 of the first subset stores the token bit. Regardless of whether the token bit is in a storage circuit of the first or second subset, at step 126 the token bit can be moved to the next storage circuit in the ring, and the method returns to step 120 for another cycle. Although it was not necessary for the example of FIGS. 7-12, for other combination of input/output flit size, it may be needed to have some cycles when the token bit does not advance to give time for reading out the output flit, as shown for the example of FIGS. 4 and 5.

Figure 14:
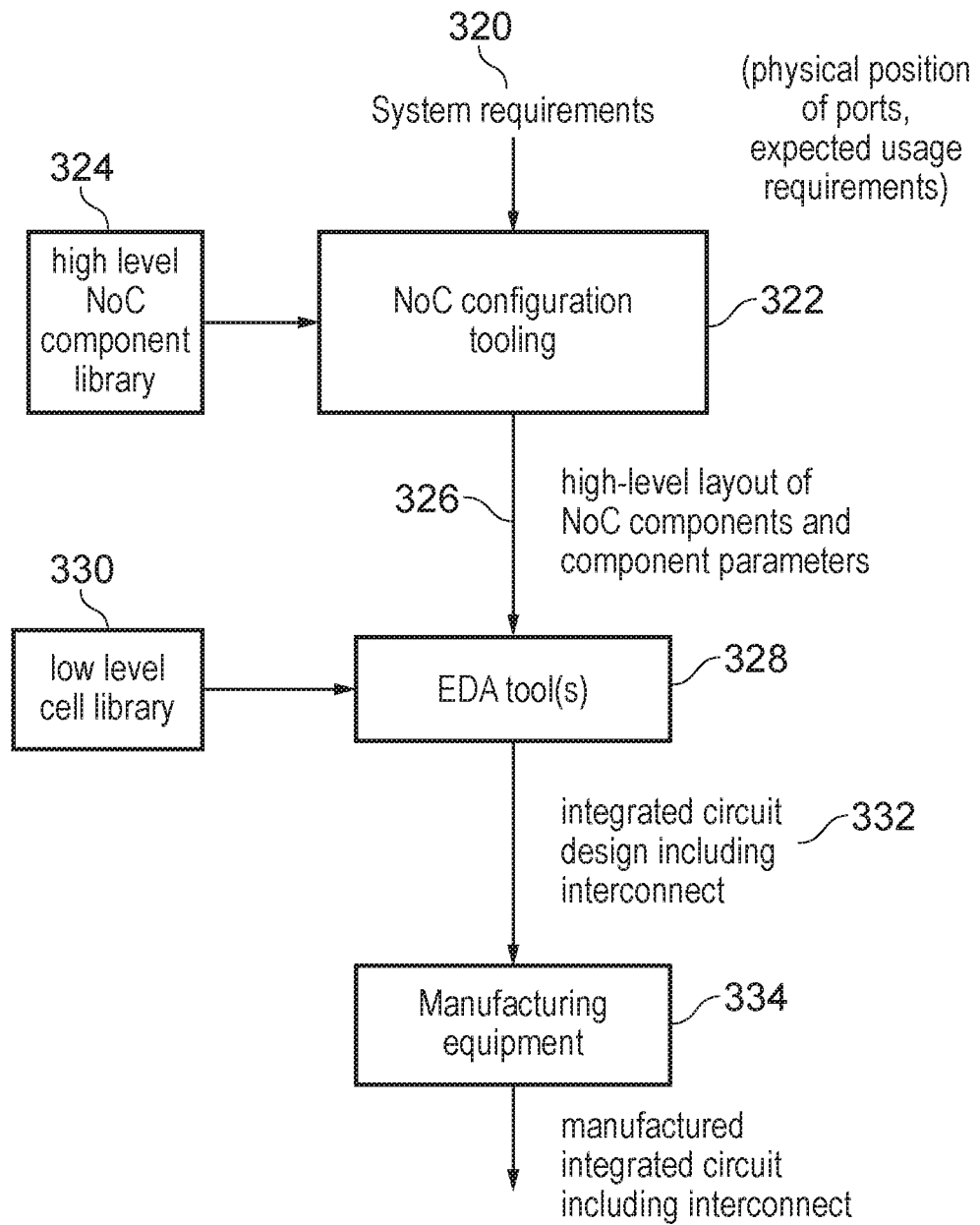
FIG. 14 schematically illustrates design and manufacture of an integrated circuit including an interconnect.

FIG. 14 schematically illustrates an example of an electronic design process which may use automated design techniques to simplify the design process for designing an integrated circuit or system on chip 2. A system designer or an electronic design tool performing an earlier stage of the design process may specify various system requirements 320, such as the physical position of the ingress/egress ports (interfaces) 46, 48 to be used for the on-chip interconnect 6, and/or expected usage requirements (e.g. which pairs of ports 46, 48 are likely to require communication links between them and the expected level of bandwidth for different pairs of ports depending on expected data traffic or prioritisation of different requesters relative to each other). A NoC configuration tooling program 322 stored on a non-transitory storage medium and executed on a data processing apparatus may use the system requirements, together with a component library 324 providing a high level representation of the various NoC components which can be selected for assembling the NoC, to generate an electronic design file 326 which provides a high level layout of the NoC components and specifies various parameters of those components such as parameters for configuring the particular properties of the components.

For example, the component library 324 could specify a range of components, such as the requester interface 46, completer interface 48, routers 44, or data resizer 60 as discussed above. For some of these types of component, multiple alternative types could be specified in the component library for selection depending on the particular needs of the system requirements 320. Alternatively a single type of component could be provided but the NoC configuration tooling 322 may specify, as properties of a given component, certain variables which may tune behaviour of a given component of the NoC or control how that component is manufactured. For example, the parameters for a requester interface 46 could specify the size of the interface with the corresponding requester device, a subset of completer interfaces 48 for which routing of network traffic is expected to be needed, a packet format to be used for packets routed to particular destinations, etc. The parameters for the resizer 60 may specify the values L, M, N described above, and an indication of the layouts of the respective sequencer registers (e.g. the relative positions of the first/second subsets of the storage circuits 100). The NoC configuration tooling 322 may determine such requirements based on the system requirements that were input.

The high level layout file 326 generated by the NoC configuration tooling 322 is provided to an electronic design automation (EDA) tool 328 which uses a low level cell library 330 specifying standard cells of integrated circuit components at a more detailed level than the NoC component library 324, and generates an integrated circuit design file 332 which specifies the particular gates or transistors to be generated for the integrated circuit which includes the interconnect designed by the NoC configuration tooling 322. In some cases the EDA tool 328 may actually comprise a number of tools which gradually iterate the design to produce more and more detailed circuit-level representations. The EDA tools 328 may also carry out timing analysis to check whether the designed circuit would meet its timing requirements (testing for setup and hold violations for example), and may iterate the design if earlier attempts fail the timing analysis. The eventually prepared integrated circuit design represented by the design file 332 is the provided to a manufacturer who uses the design file to control manufacturing equipment 334 to manufacture the integrated circuit with the required connections between transistors in order to implement an integrated circuit including the interconnect.

Figure 15:
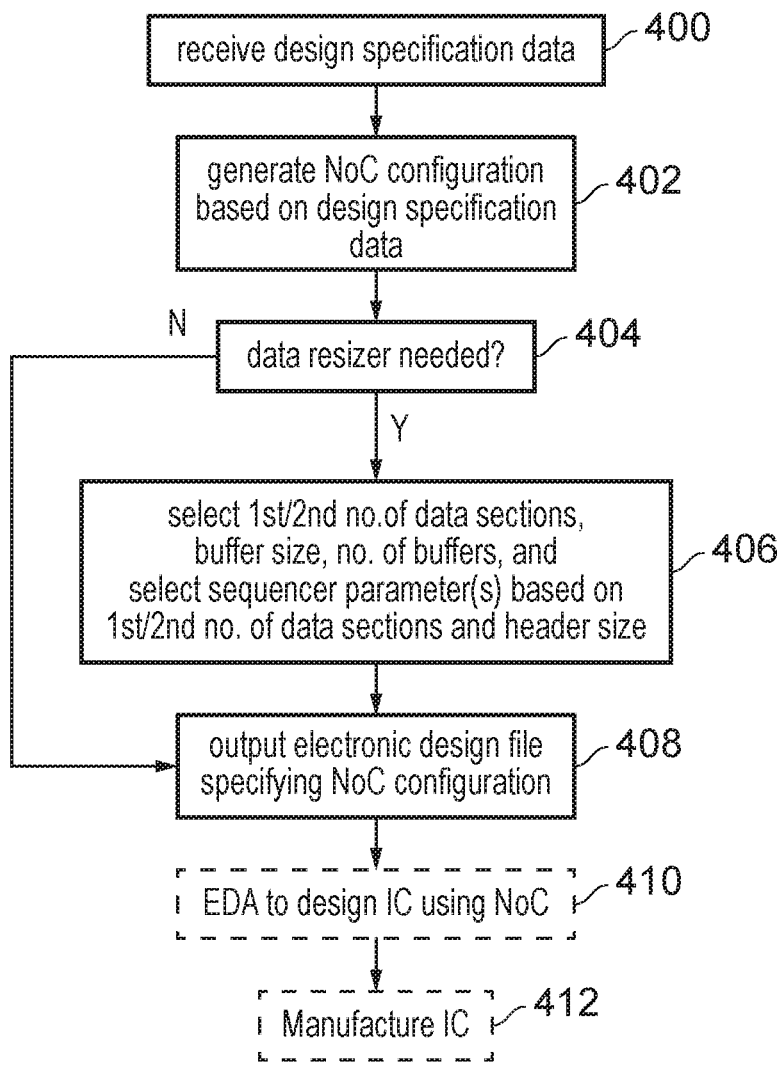
FIG. 15 is a flow diagram illustrating a method of generating an electronic design file representing a design of an on-chip interconnect.

FIG. 15 is a flow diagram showing a method of generating an electronic design file representing configuration of the network on chip 6 which may include support for chunk identifying information reconstruction. At step 400 the design specification data 320 is received which represents properties of the interconnect to be generated. For example the design specification data may specify the number of nodes to be connected using the network (e.g. number of requester and completer devices), the data width of the respective channels 50, 54 used for conveying data to those nodes, and expected usage requirements such as levels of service or bandwidth required for a particular combinations of requester and completer device. In response to the design specification data at step 402 the system tooling 322 generates the high level layout for the network within the interconnect 6, e.g. including an arrangement of routers 44, data resizers 60 or other components of the network, as well as the provided requester and completer interfaces 46, 48. The network configuration may be generated with the layout represented at a relatively high level which may specify the components to be generated at a relatively abstract level, for example merely specifying identifiers of the cell type to be provided and optionally one or more configuration parameters for adjusting properties of that component, but not necessarily specifying the exact transistor level layout for each component.

At step 404, the system tooling 322 determines whether any data resizers 60 are needed, and if so, at step 406 the tooling 322 determines, for each resizer 60, the first number of data sections L within each input flit and the second number of data sections M within each output flit. L and M could be different for different resizers. L and M may for example depend on the expected bandwidth for certain pairs of endpoints, which may cause a transmission path supporting a higher number of data sections per flit to be provided in one part of the network compared to another. The number of output buffers N in the resizer could be a fixed value (e.g. 2 buffers may often be sufficient), or could be variable (e.g. if desired 3 or more buffers could be provided to reduce the frequency with which the convolution problem occurs).

Based on the first/second number of data sections L and M and the number of buffers N, at step 406 the system tooling 322 selects the sequencer parameters which define the layout of the shift registers. The selection of the sequencer parameters can also depend on the header size H (the number of data sections of a first input flit in a given network packet that are allocated for control information which do not need to be mapped into the corresponding output flits).

Figure 16:
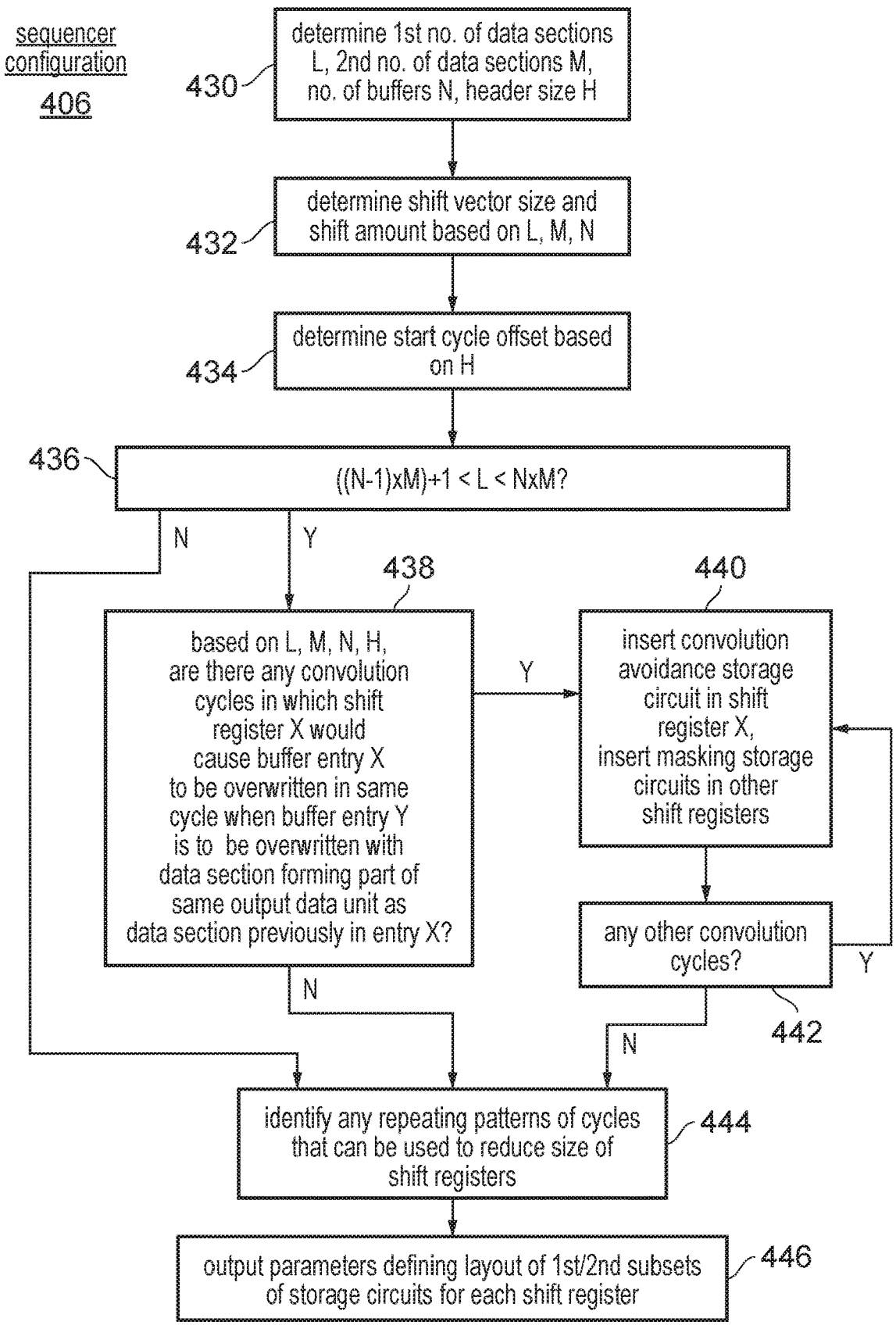
FIG. 16 is a flow diagram illustrating a method of configuring parameters of resizing circuitry to be included in the on-chip interconnect design.

FIG. 16 shows the sequencer configuration step 406 in more detail. At step 430, the system tooling determines L, M, N, H as discussed above. At step 432, the shift vector size and shift amount are determined based on L, M and N, for example according to the following relations:

If L>M*N: shift vector length=L, and shift amount=M*N;
If L≤M*N: shift vector length=M*N and shift amount=L.

By default, the shift registers have a symmetric design (similar to the example of FIG. 4) where each register has a number of storage circuits equal to the shift vector length, of which the number of "active" storage circuits of the first subset is equal to the shift amount and the remaining storage circuits are silent storage circuits of the second subsets. The positions of the first/second subsets of storage circuits and the tap points of the respective multiplexer lines relative to the first subset of storage circuits are selected based on the shift vector rotation pattern when the vector is rotated by the shift amount between cycles. At step 434 the start cycle offset is determined based on the header size H. The tooling 322 determines the start positions at which the token bit is to be inserted in each sequencer based on this start cycle offset, to ensure that in the start cycle the first non-header data section of the input flit is written into output buffer entry 1.

This default arrangement of the shift registers can be modified by subsequent steps. At step 436, the tooling 322 determines whether L is greater than ((N−1)*M)+1 and less than N*M. If so, then the convolution problem could arise, and at step 438 the tooling 322 identifies whether there are any convolution cycles in which a given shift register X would cause output buffer entry X to be overwritten in the same cycle when buffer entry Y is to be overwritten with another data section which is to form part of the same output data unit as the overwritten data section previously stored in buffer entry X. Whether such convolution cycles arise depends on the particular combination of L, M, N and H. There could be multiple such convolution cycles. The convolution cycles could be identified by iterating the development of the shift vector as it undergoes successive shifts and looking for a cycle where the writing of buffer entries wraps round to the start of a given output buffer in the same cycle where the final buffer entry of that same output buffer is also being overwritten.

At step 440, if a convolution cycle has been identified, then a convolution avoidance storage circuit 100-C is inserted into shift register X, to prevent the overwriting of the previous entry in that buffer in that cycle. The position of the convolution avoidance storage circuit is determined to be at the position in the ring immediately before the following storage circuit 100-F which would have caused buffer entry X to be overwritten prematurely. Also, masking storage circuits 100-M are inserted in other shift registers at the position just after the storage circuit which stores the token bit in the convolution cycle. Note that the effect of step 440 is to provide different circular shift registers with different patterns of arrangement of the first/second storage circuits.

At step 442 it is determined whether there are any other convolution cycles occurring for this instance of the resizer 60. If so, then again at step 440 further convolution avoidance storage circuits 100-C and masking storage circuits 100-M can be added to certain shift registers.

Once no more convolution cycles remain, the method to step 444. Also, if at step 436 it was determined that L ((N−1)*M)+1 or L≥N*M then steps 438 to 442 can be omitted and the method proceeds straight to step 444. Also, if at step 438 it was determined that there were no convolution cycles, then the method proceeds straight to step 444 omitting steps 440 and 442. It will be appreciated that step 436 is not essential and could be omitted—in this case step 438 may be performed regardless of whether L is between ((N−1)*M)+1 and L≥N*M. However, checking whether L is that range first can save the overhead of identifying the convolution cycles. However, if L is in that range, this does not guarantee that there will be convolution cycles, as this also depends on the header size H.

At step 444 the system tooling 322 identifies whether there is a repeating pattern of cycles (of a number of cycles fewer than the shift vector length) that can be used to reduce the size of each shift register. This is the case for the example of FIGS. 7-12 where, although the shift vector length is 8 and so one would expect an 8-cycle alternating pattern (supplemented by 4 additional convolution/masking cycles as shown for cycles 0 to 11 in FIGS. 8-11), in practice the sequence repeats every 6 cycles and so the shift registers can be reduced to 6 storage circuits 100.

At step 446, the system tooling outputs parameters defining the layout of the first/second subsets of storage circuits for each shift register. This could for example be represented according to an array of elements indicating for each element position whether the corresponding storage circuit in the shift register is in the first or second subset, and if in the first subset, which multiplexer selection line should be coupled to that storage circuit's output.

It will be appreciated that FIG. 16 shows one way of determining the parameters of each sequencer's circular shift register. Alternatively, this analysis could be performed in advance, and a lookup table could be defined storing, for different combinations of numbers of input/output data sections L, M, data buffers N and header data sections H, the particular arrangement of shift register layouts to select. In this case, the method of FIG. 16 is not needed and at step 406 of FIG. 15 the parameters can be read out from the lookup table structure, indexed based on the values of L, M, N, H determined based on the design specification data 402 for the particular instance of the resizer 60 being configured.

Referring again to FIG. 15, after selecting the parameters of the sequencers in the resizer (and configuring parameters for any other components of the interconnect as needed), at step 408 the design file identifying the high level layout of the interconnect 6 is output in electronic form. Optionally, this electronic design file may then at step 410 be supplied to an EDA tool 328 which uses a standard cell library 330 to provide the specific gate-level design for each of the high level components indicated by the system tooling 322 in the design file 328, to generate a representation of the specific integrated circuit design 2 which can then be manufactured at step 412. At the EDA stage the EDA tool 328 may also provide more detailed gate-level designs for the requester and completer devices themselves, not just the interconnect. Alternatively, the electronic design file representing the interconnect may be output at step 408 and stored to a recording medium, for supply to the EDA tool 328 at a later stage, so the EDA and manufacture stages 410, 412 are not essential.

Hence, while the techniques of sequencing control for shift registers of a data unit resizer described above can be implemented in a physical interconnect which represents an actual component included in an integrated circuit, the technique could also be embodied within a non-transitory storage medium which stores an electronic design file representing a design of the interconnect. The design file could for example specify the components to be included in the interconnect such as the requester and completer interfaces and other network components such as routers and resizers. Using electronic design files to control the automated manufacture of integrated circuits can be useful because the number of transistors or gates in an integrated circuit in modern systems is so vast that a human designer is unlikely to be able to keep track of the design. Also, use of electronic design files at the higher level abstraction can be useful because this means the human designer can simply focus on the general design of the network on chip without needing to consider individual gate level representation. The automatic computer-implemented generation of a network on chip configuration 326 (including the resizer sequencers) to comply with certain design requirements represented by the design specification data 320 can also be useful to allow configurable network on chips to be generated more efficiently without needing detailed expert knowledge by the user of how to develop a suitable network configuration to provide any required bandwidth/quality of service guarantees. The resizing technique described above is particularly useful for such a configurable network on chip where there may be a wide range of capabilities of different requester and completer end points and so there may be a need for resizers to handle relatively arbitrary combinations of input/output numbers of data sections at non-power of 2 ratios.

n the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. Resizing circuitry for resizing data units transferred between nodes of an integrated circuit; the resizing circuitry comprising:
   at least one buffer comprising a plurality of buffer entries;
   a plurality of circular shift registers, each of the plurality of buffer entries corresponding to one of the plurality of circular shift registers, each circular shift register comprising a plurality of storage circuits connected in a ring to transfer a token bit from storage circuit to storage circuit; and
   selection circuitry to control, based on the plurality of circular shift registers, writing of data sections of input data units having a first number of data sections to the at least one buffer, to form output data units having a second number of data sections; in which:
   for a given buffer entry corresponding to a given circular shift register:
      in a cycle when the token bit is stored in one of a first subset of storage circuits of the given circular shift register, the selection circuitry is configured to control writing of a selected data section of a received input data unit to the given buffer entry, the selected data section selected depending on which of the first subset of storage circuits stores the token bit; and
      in a cycle when the token bit is stored in one of a second subset of storage circuits of the given circular shift register, the selection circuitry is configured to prevent the given buffer entry being overwritten; and
   the plurality of circular shift registers include at least two circular shift registers with different arrangements of the second subset of storage circuits relative to the first subset of storage circuits.

2. The resizing circuitry according to claim 1, in which for the at least two circular shift registers, the selection circuitry is configured to select as the selected data section a first data section of the received input data unit when the token bit is stored in a first storage circuit of the first subset, and to select as the selected data section a second data section of the received input data unit when the token bit is stored in a second storage circuit of the first subset; and
   the at least two circular shift registers have different numbers of storage circuits of the second subset connected in the ring between the first storage circuit and the second storage circuit.

3. The resizing circuitry according to claim 1, in which the plurality of circular shift registers include a convolution-avoiding circular shift register comprising a convolution avoidance storage circuit of the second subset, where the convolution avoidance storage circuit is positioned in the ring to prevent a previously written data section in the buffer entry corresponding to the convolution-avoiding circular shift register being overwritten with one data section of the received input data unit in a cycle when another buffer entry is to be written with another data section of the received input data unit, where the previously written data section and the other data section are to form part of the same output data unit.

4. The resizing circuitry according to claim 3, in which the convolution-avoiding circular shift register comprises a following storage circuit, where the convolution-avoiding circular shift register is configured to transfer the token bit from the convolution avoidance storage circuit to the following storage circuit in a cycle following a cycle in which the token bit is stored in the convolution avoidance storage circuit; and
   in a cycle when the token bit is stored in the following storage circuit, the selection circuitry is configured to select said one data section of the received input data unit as the selected data section to be written to the buffer entry corresponding to the convolution-avoiding circular shift register.

5. The resizing circuitry according to claim 3, in which the circular shift register corresponding to the other buffer entry comprises a masking storage circuit of the second subset, where the masking storage circuit is positioned in the ring to prevent the other buffer entry being overwritten in a cycle following a cycle in which the other buffer entry is written with the other data section of the received data unit.

6. The resizing circuitry according to claim 1, in which, based on the different arrangements of the second subset of storage circuits relative to the first subset of storage circuits in the plurality of circular shift registers, the selection circuitry is configured to control writing to the at least one buffer in a pair of successive cycles such that:
  in a first cycle of the pair of successive cycles, a first subset of the plurality of buffer entries is overwritten with one or more data sections of the received input data unit, and a second subset of the plurality of buffer entries is prevented from being overwritten; and
  in a second cycle of the pair of successive cycles, the first subset of the plurality of buffer entries is prevented from being overwritten, and the second subset of the plurality of buffer entries is overwritten with one or more remaining data sections of the received input data unit other than the one or more data sections written in the first cycle.

7. The resizing circuitry according to claim 1, in which the first number of data sections is greater than the second number of data sections.

8. The resizing circuitry according to claim 1, comprising N buffers, where N≥2, and each buffer comprises M buffer entries, where M is equal to the second number of data sections.

9. The resizing circuitry according to claim 8, in which the first number of data sections is greater than ((N−1)*M)+1 and less than N*M.

10. The resizing circuitry according to claim 1, in which the first number of data sections and the second number of data sections have a ratio other than an exact power of 2.

11. The resizing circuitry according to claim 1, comprising output circuitry to output an output data unit formed in a given buffer for transfer to a downstream node of the integrated circuit; in which:
  unless a number of remaining data sections of input data units to be transferred is insufficient to populate a full output data unit, the output circuitry is configured to defer outputting the output data unit until the output data unit is fully populated with the second number of data sections obtained from one or more received input data units.

12. The resizing circuitry according to claim 1, in which the selection circuitry is configured to control the writing of data sections to the at least one buffer so that a relative order of the data sections in the output data units corresponds to a relative order of the data sections in the input data units.

13. The resizing circuitry according to claim 1, in which the selection circuitry comprises a plurality of multiplexers each corresponding to a respective one of the buffer entries;
  each multiplexer comprising a plurality of selection lines to control selection of data sections at different input data section positions within the received input data unit; and
  for a given multiplexer, each of the plurality of selection lines is coupled to an output of a respective storage circuit of the first subset within a corresponding one of the plurality of circular shift registers.

14. An on-chip interconnect to transfer data between nodes of an integrated circuit, the on-chip interconnect comprising the resizing circuitry according to claim 1.

15. An integrated circuit comprising the on-chip interconnect of claim 14.

16. A method for resizing data units transferred between nodes of an integrated circuit; the method comprising:
  controlling writing of data sections of input data units having a first number of data sections to at least one buffer comprising a plurality of buffer entries, to form output data units having a second number of data sections, where the writing is controlled based on a plurality of circular shift registers, each of the plurality of buffer entries corresponding to one of the plurality of circular shift registers, each circular shift register comprising a plurality of storage circuits connected in a ring to transfer a token bit from storage circuit to storage circuit; and
  for a given buffer entry corresponding to a given circular shift register:
    in a cycle when the token bit is stored in one of a first subset of storage circuits of the given circular shift register, controlling writing of a selected data section of a received input data unit to the given buffer entry, the selected data section selected depending on which of the first subset of storage circuits stores the token bit; and
    in a cycle when the token bit is stored in one of a second subset of storage circuits of the given circular shift register, preventing the given buffer entry being overwritten;
  wherein the plurality of circular shift registers include at least two circular shift registers with different arrangements of the second subset of storage circuits relative to the first subset of storage circuits.

17. A computer-implemented method of generating an electronic design file representing a design of an on-chip interconnect for providing data transfer between devices of an integrated circuit; the method comprising:
  in response to design specification data identifying properties of the devices to be connected by the on-chip interconnect, generating the electronic design file specifying that the on-chip interconnect comprises resizing circuitry for resizing data units transferred by the on-chip interconnect;
  the resizing circuitry comprising:
    at least one buffer comprising a plurality of buffer entries;
    a plurality of circular shift registers, each of the plurality of buffer entries corresponding to one of the plurality of circular shift registers, each circular shift register comprising a plurality of storage circuits connected in a ring to transfer a token bit from storage circuit to storage circuit; and
    selection circuitry to control, based on the plurality of circular shift registers, writing of data sections of input data units having a first number of data sections to the at least one buffer, to form output data units having a second number of data sections; in which:
    for a given buffer entry corresponding to a given circular shift register:
      in a cycle when the token bit is stored in one of a first subset of storage circuits of the given circular shift register, the selection circuitry is configured to control writing of a selected data section of a received input data unit to the given buffer entry, the selected data section selected depending on which of the first subset of storage circuits stores the token bit; and
      in a cycle when the token bit is stored in one of a second subset of storage circuits of the given circular shift register, the selection circuitry is configured to prevent the given buffer entry being overwritten; and
    the plurality of circular shift registers include at least two circular shift registers with different arrangements of the second subset of storage circuits relative to the first subset of storage circuits.

18. The method of claim 17, comprising:
selecting, based on the design specification data, the first number of data sections and the second number of data sections for the resizing circuitry; and
based on the first number of data sections and the second number of data sections, selecting at least one parameter of the resizing circuitry indicative of the different arrangements of the storage circuits of the first subset and the second subset in the at least two circular shift registers; and
recording the at least one parameter in the electronic design file.

19. A non-transitory storage medium storing a computer program to control a data processing apparatus to perform the method of claim 17.

\* \* \* \* \*